United States Patent
Cassidy et al.

(10) Patent No.: US 10,026,101 B2
(45) Date of Patent: Jul. 17, 2018

(54) LEVERAGING PUSH NOTIFICATION CAPABILITIES ON MOBILE DEVICE TO DYNAMICALLY UPGRADE INTERNET ACCESS SERVICE ENTITLEMENT

(71) Applicant: Guest Tek Interactive Entertainment Ltd., Calgary (CA)

(72) Inventors: Brendan G. Cassidy, Calgary (CA); Peter S. Warrick, Calgary (CA); Lindsey M. Carriere, Calgary (CA)

(73) Assignee: Guest Tek Interactive Entertainment Ltd., Calgary (CA)

( * ) Notice: Subject to any disclaimer, the term of this patent is extended or adjusted under 35 U.S.C. 154(b) by 610 days.

(21) Appl. No.: 14/633,309

(22) Filed: Feb. 27, 2015

(65) Prior Publication Data

US 2015/0254726 A1    Sep. 10, 2015

(30) Foreign Application Priority Data

Mar. 4, 2014 (CA) .................................. 2844724

(51) Int. Cl.
*G06Q 30/00* (2012.01)
*G06Q 30/02* (2012.01)
(Continued)

(52) U.S. Cl.
CPC ..... *G06Q 30/0269* (2013.01); *G06Q 30/0261* (2013.01); *G06Q 50/12* (2013.01);
(Continued)

(58) Field of Classification Search
CPC .................................................. G06Q 30/0241
(Continued)

(56) References Cited

U.S. PATENT DOCUMENTS 6,622,307 B1   9/2003   Ho
6,636,894 B1  10/2003   Short et al.
(Continued)

FOREIGN PATENT DOCUMENTS

CA       2788573 A1    11/2012
WO       2005065166     7/2005

OTHER PUBLICATIONS

Office action dated Sep. 15, 2015 mailed by CIPO in counterpart Canadian Patent Application No. 2,844,724.
(Continued)

*Primary Examiner* — Matthew L Hamilton
(74) *Attorney, Agent, or Firm* — ATMAC Patent Services Ltd.; Andrew T. MacMillan

(57) ABSTRACT

An app server receives a device token from a software application on a mobile device. The device token identifies the mobile device for pushing notification messages of the software application to the mobile device via a push notification system. The mobile device is monitored while accessing the Internet in order to detect when the user may benefit from upgraded access to the Internet. The app server then sends one or more notification message(s) to the user such as by sending a message to the device token of the mobile device via the push notification system or to a display device associated with the user at the hospitality establishment. The notification message invites the user to upgrade their Internet access. The push notification system alerts the user to the notification message via the user interface of the mobile device even when the software application is not running on the mobile device.

20 Claims, 10 Drawing Sheets

(51) Int. Cl.
*H04L 29/08* (2006.01)
*G06Q 50/12* (2012.01)
*H04W 4/50* (2018.01)
*H04W 4/02* (2018.01)

(52) U.S. Cl.
CPC .............. *H04L 67/26* (2013.01); *H04W 4/50* (2018.02); *H04W 4/02* (2013.01)

(58) Field of Classification Search
USPC .......................................................... 705/14
See application file for complete search history.

(56) References Cited

U.S. PATENT DOCUMENTS

| | | | |
|---|---|---|---|
| 7,689,716 B2 | 3/2010 | Short et al. | |
| 7,920,850 B1 * | 4/2011 | Harris .................... | G06Q 30/02 455/414.1 |
| 8,027,877 B2 * | 9/2011 | Crolley ................. | G06Q 30/02 455/456.3 |
| 8,045,557 B1 | 10/2011 | Sun et al. | |
| 8,448,231 B2 | 5/2013 | Ong | |
| 8,650,495 B2 | 2/2014 | Ong | |
| 8,713,612 B2 | 4/2014 | Levy et al. | |
| 8,813,138 B2 | 8/2014 | Warrick et al. | |
| 8,813,211 B2 | 8/2014 | Baker et al. | |
| 2002/0184630 A1 | 12/2002 | Nishizawa et al. | |
| 2003/0067554 A1 | 4/2003 | Klarfeld et al. | |
| 2003/0169460 A1 * | 9/2003 | Liao ...................... | H04W 28/20 358/426.08 |
| 2005/0125835 A1 | 6/2005 | Wei | |
| 2005/0266825 A1 | 12/2005 | Clayton | |
| 2005/0283791 A1 | 12/2005 | McCarthy et al. | |
| 2006/0277576 A1 | 12/2006 | Acharya et al. | |
| 2007/0174873 A1 | 7/2007 | Griggs | |
| 2007/0198532 A1 | 8/2007 | Krikorian et al. | |
| 2007/0199019 A1 | 8/2007 | Angiolillo et al. | |
| 2007/0299976 A1 | 12/2007 | Zafar et al. | |
| 2008/0200154 A1 | 8/2008 | Maharajh et al. | |
| 2009/0059962 A1 | 3/2009 | Schmidt et al. | |
| 2009/0313053 A1 * | 12/2009 | Gengarella ............ | G06Q 10/02 705/5 |
| 2010/0082784 A1 | 1/2010 | Rosenblatt et al. | |
| 2010/0082681 A1 | 4/2010 | Adimatyam et al. | |
| 2010/0130176 A1 * | 5/2010 | Wan ....................... | G06Q 30/02 455/414.1 |
| 2010/0169475 A1 | 7/2010 | Woundy et al. | |
| 2010/0191551 A1 | 7/2010 | Drance et al. | |
| 2010/0332615 A1 | 12/2010 | Short et al. | |
| 2011/0103564 A1 * | 5/2011 | Couse ................. | H04M 1/2535 379/201.03 |
| 2011/0298596 A1 | 12/2011 | Warrick | |
| 2011/0302607 A1 | 12/2011 | Warrick et al. | |
| 2012/0155296 A1 * | 6/2012 | Kashanian .......... | H04L 12/1417 370/252 |
| 2013/0122910 A1 * | 5/2013 | Singh .................... | H04W 36/18 455/437 |
| 2013/0305320 A1 | 11/2013 | Warrick et al. | |
| 2013/0336238 A1 * | 12/2013 | Converse .............. | H04W 76/02 370/329 |
| 2013/0346564 A1 | 12/2013 | Warrick et al. | |
| 2014/0032781 A1 * | 1/2014 | Casey ................. | H04N 21/2662 709/233 |
| 2014/0068721 A1 | 3/2014 | Ong et al. | |
| 2014/0114706 A1 * | 4/2014 | Blakely ................. | G06Q 10/02 705/5 |
| 2014/0194153 A1 * | 7/2014 | Salkintzis ............... | H04W 4/12 455/466 |
| 2014/0344890 A1 | 11/2014 | Warrick et al. | |
| 2015/0071181 A1 * | 3/2015 | Nasir .................... | H04W 28/20 370/329 |
| 2015/0262155 A1 * | 9/2015 | Mendiola ............. | G06Q 20/145 705/40 |
| 2015/0262281 A1 * | 9/2015 | Shaphy .............. | G06Q 30/0631 705/26.7 |
| 2015/0310541 A1 * | 10/2015 | Pamir ................. | G06F 3/04842 705/14.66 |
| 2015/0382244 A1 * | 12/2015 | Lau ........................ | H04L 51/18 370/235 |
| 2016/0227408 A1 * | 8/2016 | Sherin ................ | H04N 21/2143 |

OTHER PUBLICATIONS

Hafizji, Ali; "Apple Push Notification Services in iOS 6 Tutorial: Part 1/2"; May 23, 2013 (21 pages).

Apple Inc.; "Apple Push Notification Service"; Sep. 18, 2013 (12 pages).

* cited by examiner

Example stored data table

224

| 300 | 302 | 304 | 306 | 308 | HSIA service | | |
|---|---|---|---|---|---|---|---|
| MAC address | IP address | User identifier | Device Token (for push notifications) | 310 Login expiry | 312 Service entitlement | 314 Max. No. of devices | 316 Bandwidth allocation |
| MAC-1 | IP-1 | UID-1 | Token-1 | EXPIRY-1 | BASIC | 1 | 128K/s |
| MAC-2 | IP-2 | UID-2 | Token-2 | EXPIRY-2 | BASIC | 1 | 128K/s |
| MAC-3 | IP-3 | UID-3 | Token-3 | EXPIRY-3 | BASIC | 1 | 128K/s |
| MAC-4 | IP-4 | UID-4 | Null | EXPIRY-4 | PREMIUM | 5 | 1.5M/s |
| MAC-5 | IP-5 | UID-5 | Null | EXPIRY-5 | PREMIUM | 5 | 1.5M/s |
| ⋮ | ⋮ | ⋮ | ⋮ | ⋮ | ⋮ | ⋮ | ⋮ |

FIG. 3

LEVERAGING PUSH NOTIFICATION CAPABILITIES ON MOBILE DEVICE TO DYNAMICALLY UPGRADE INTERNET ACCESS SERVICE ENTITLEMENT

CROSS-REFERENCE TO RELATED APPLICATIONS

This application claims the benefit of Canadian Patent Application No. 2,844,724 filed Mar. 4, 2014, which is incorporated herein by reference.

BACKGROUND OF THE INVENTION (1) Field of the Invention

The invention pertains generally to technology utilized to provide and access services at hospitality establishments. More specifically, the invention relates to leveraging a push notification capability of a mobile application installed on a mobile device and used by a guest of a hospitality establishment to access a first service to also send event-triggered invitations to upgrade the guest's service entitlement for a second service offered by the hospitality establishment.

(2) Description of the Related Art

Internet access is a service offered by many hospitality establishments. For example, an Internet café may offer Internet access to attract customers and a hotel may offer Internet access to attract and/or meet the expectations of guests. Besides attracting users to further the establishment's primary business focus, providing Internet access is often also a revenue stream in and of itself; for instance, many hospitality establishments offer tiered Internet options such as a "Basic" (free or low-cost) package with low bandwidth suitable for simple email checking on a single device only, in addition to one or more "Premium" (higher cost) packages that have increased bandwidth speeds and/or other capabilities such as support for multiple devices per user. Thus, although a hospitality establishment may specialize in another service such lodging and/or retail food services, the establishment also benefits financially from sales of its Internet access package(s).

One problem with the state of the art is that sometimes a user of a hospitality establishment may initially choose a lower valued (e.g., free) Internet package only to later find that the attainable speeds at that service entitlement are too slow for the user's intended online activities. For example, after electing for the basic Internet option at initial signup, a user may try to stream movies from an online content provider and discover that the video playback suffers from low resolution and/or frequently pauses to buffer. Often the user may be willing at this point to pay more to the hospitality establishment in order to upgrade their Internet experience; however, it is typically difficult for an already-logged-in user to figure out how such an upgrade to a premium Internet package can be initiated.

One common approach to make users aware of the upgrade process is to provide a welcome web page after a user first logs in that includes hypertext form buttons or links that the user can click to upgrade to a higher speed Internet package by agreeing to an additional charge. Since newly logged in users are not usually interested in immediately upgrading, the welcome page typically includes a textual recommendation that the user should bookmark in their web browser or otherwise save the uniform resource locator (URL) of the welcome page to thereby enable the user to return in the future if an upgrade is desired.

Although a user returning to the welcome page URL does allow the user to perform a bandwidth upgrade, many users will not carefully read or bookmark the welcome page and will instead immediately browse to external websites as soon as they are logged in, thereby losing the content of the welcome screen. Should these users later desire to upgrade, they will not remember or be able to find the URL of the welcome page, and the hospitality establishment will lose upgrade revenue if the user gives up.

Attempts have been made to make the upgrade process easier for users inclined to ignore the initial welcome screen. In one attempt, a separate, minimized browser window (e.g., a pop-up or pop-behind) is opened upon initial login that includes a bandwidth upgrade control panel. However, modern browsers by default block popups. Furthermore, even if the new window is allowed to be opened by the browser, many users ignore or immediately close new windows without considering their purpose.

Another attempt involves keeping the bandwidth upgrade options visible to the user at all time during browsing by forcing the user to browse the web within a hypertext markup language (HTML) frame. Outside the border of the frame but still visible within the browser content window are Internet package upgrade buttons. However, this method is undesirable at least because many websites do not operate properly when viewed within a frame and some websites specifically include JavaScript to "break out" of any such enclosing frames since it is a security risk. Furthermore, many mobile devices capable of Internet browsing have small screen resolutions and it is undesirable to constantly occupy valuable screen space with upgrade buttons that are, for many users, never used.

Another attempt involves dynamically hijacking the user's HTTP connections in order to insert extra HTML and/or JavaScript to provide Internet upgrade options at certain times while the user is browsing the web. For example, an intermediate device such as a gateway at the hotel positioned between the client device and a web server on the Internet may insert an "upgrade Internet access" button or message to that effect in the HTML content of a web page that is being sent to the client device for display in the web browser. Alternatively, rather than modifying web page content, the web page content may be completely replaced with a redirect back to the establishment's welcome page at various points during the user's Internet session in order to see if the user wishes to upgrade.

However, in addition to the fact that interfering with the user's web traffic in these manners is difficult to do without also breaking the user's existing web sessions, these techniques provide no benefit at all when the user's browser is employing a hypertext transfer protocol secure (HTTPS) connection. The very purpose of HTTPS is to maintain the security and integrity of webpage content and web sessions; it is not possible for an intermediate gateway device to hijack these encrypted sessions to insert content or redirect the user in a way that will not cause the user's browser to display prominent security warnings.

At best modifying web content as it is passed to the client device for display in a web browser could only work if the user has requested to view an unencrypted web page for display in a web browser. In practice, many mobile devices run other applications such as custom content provider apps that are not web browsers but that receive (or send) large amounts of data from the Internet such as when playing an online movie within the app. Modifying network traffic destined to these apps by an intermediate gateway would not necessarily result in the user seeing any Internet upgrade messages and may instead cause the app to crash or merely display a cryptic error message due to the unrecognized data inserted by the gateway.

It would be desirable for a hospitality establishment to be able to offer users an easy way to upgrade their Internet session without requiring the user to take any unrealistic actions such as bookmarking or saving the URL of a welcome page and without resorting to hijacking the user's ongoing network connections.

BRIEF SUMMARY OF THE INVENTION

According to an exemplary embodiment of the invention, disclosed is a method including communicating over a network with a software application installed and running on a mobile device. While running on the mobile device, the software application allows a user of the mobile device to interact with a user interface of the mobile device in order to access a first service offered by a hospitality establishment. The method further includes receiving a device token from the software application. The device token identifies the mobile device for use when pushing notification messages associated with the software application to the mobile device via a push notification system. The method further includes determining that the mobile device is accessing, with a limited service entitlement, a second service offered by the hospitality establishment. The second service is independent from the software application meaning that the mobile device can access the second service without running the software application. The method further includes monitoring the mobile device's usage of the second service in order to detect a predetermined condition that indicates that the user may benefit from the mobile device gaining access to the second service with an upgraded service entitlement. The method further includes sending a notification message to the device token via the push notification system in response to detecting the predetermined condition. The notification message invites the user of the mobile device to upgrade from the limited service entitlement to the upgraded service entitlement for the second service, and the push notification system alerts the user to the notification message via the user interface of the mobile device even when the software application is not running on the mobile device.

According to another exemplary embodiment of the invention, disclosed is an apparatus including one or more processors configured to communicate over a network with a software application installed and running on a mobile device. While running on the mobile device, the software application allows a user of the mobile device to interact with a user interface of the mobile device in order to access a first service offered by a hospitality establishment. The one or more processors are further configured to receive a device token from the software application. The device token identifies the mobile device for use when pushing notification messages associated with the software application to the mobile device via a push notification system. The one or more processors are further configured to determine that the mobile device is accessing, with a limited service entitlement, a second service offered by the hospitality establishment. The second service is independent from the software application meaning that the mobile device can access the second service without running the software application. The one or more processors are further configured to monitor the mobile device's usage of the second service in order to detect a predetermined condition that indicates that the user may benefit from the mobile device gaining access to the second service with an upgraded service entitlement. The one or more processors are further configured to send a notification message to the device token via the push notification system in response to detecting the predetermined condition. The notification message invites the user of the mobile device to upgrade from the limited service entitlement to the upgraded service entitlement for the second service. The push notification system alerts the user to the notification message via the user interface of the mobile device even when the software application is not running on the mobile device.

According to another exemplary embodiment of the invention, disclosed is a system including means for communicating over a network with a software application installed and running on a mobile device. While running on the mobile device, the software application allows a user of the mobile device to interact with a user interface of the mobile device in order to access a first service offered by a hospitality establishment. The system further includes means for receiving a device token from the software application. The device token identifies the mobile device for use when pushing notification messages associated with the software application to the mobile device via a push notification system. The system further includes means for determining that the mobile device is accessing, with a limited service entitlement, a second service offered by the hospitality establishment. The second service is independent from the software application meaning that the mobile device can access the second service without running the software application. The system further includes means for monitoring the mobile device's usage of the second service in order to detect a predetermined condition that indicates that the user may benefit from the mobile device gaining access to the second service with an upgraded service entitlement. The system further includes means for sending a notification message to the device token via the push notification system in response to detecting the predetermined condition, the notification message inviting the user of the mobile device to upgrade from the limited service entitlement to the upgraded service entitlement for the second service. The push notification system alerts the user to the notification message via the user interface of the mobile device even when the software application is not running on the mobile device.

According to another exemplary embodiment of the invention, disclosed is a method including establishing communications with an application running on a mobile device and determining with which of a plurality of guest rooms of a hospitality establishment the mobile application is associated. The method further includes storing a record of the association in a storage device and allowing the guest to control one or more in-room entertainment devices in dependence upon commands received from the mobile application running on the mobile device. The method further includes receiving a message from a bandwidth monitor, the message indicating that bandwidth usage of a particular user is within a predetermined threshold bandwidth level of its maximum allowable; and determining that the particular user is associated with the mobile device. The method further includes sending a bandwidth upgrade message to the mobile device, the bandwidth upgrade message causing the application running on the mobile device to present a billing screen enabling the user to upgrade the maximum allowable bandwidth for a monetary charge. The method further includes upgrading the user's bandwidth in response to receiving an upgrade command from the application running on the mobile device indicating that the user has chosen to upgrade their bandwidth.

According to another exemplary embodiment of the invention, disclosed is a method of upgrading high speed Internet access (HSIA) via an audio-visual entertainment system at a hospitality establishment. The method includes allowing a guest of the hospitality establishment to access a network service from at least one mobile device, limiting access to the network service for the guest according to a first service entitlement, and monitoring usage of the network service by the guest in order to detect an occurrence of a predetermined condition indicating that the guest may benefit from accessing the network service at a higher service entitlement. The method further includes selecting a particular display device from a plurality of display devices available to the audio-visual entertainment system of the hospitality establishment upon the occurrence of the predetermined condition, the particular display device being selected according to room assignment details of the guest at the hospitality establishment, and sending a display message to the particular display device, the display message causing the particular display device to present a billing screen to the guest enabling the user to upgrade, for a monetary charge, their Internet package in order to remove the predetermined limitation. The method further includes upgrading the Internet package of the guest in response to receiving an upgrade acknowledgement indicating that the guest has chosen to upgrade their Internet package.

In an advantageous embodiment of the invention, a system leverages a push notification capability of a mobile application installed on a mobile device and used by a guest of a hospitality establishment to access a first service offered by the hospitality establishment to also send event-triggered invitations to upgrade the guest's service entitlement for a second service offered by the hospitality establishment.

In an advantageous embodiment of the invention, a system leverages a push notification capability of a mobile application installed on a mobile device and used by a guest of a hospitality establishment to access a first service offered by the hospitality establishment to also send event-triggered invitations to upgrade the guest's service entitlement for Internet access.

These and other advantages of the present invention will no doubt become apparent to those of ordinary skill in the art after reading the following detailed description of the preferred embodiment that is illustrated in the various figures and drawings.

BRIEF DESCRIPTION OF THE DRAWINGS

The invention will be described in greater detail with reference to the accompanying drawings which represent preferred embodiments thereof.

FIG. 3 shows a portion of the stored data in the storage media of FIG. 2.

DETAILED DESCRIPTION

Figure 1:
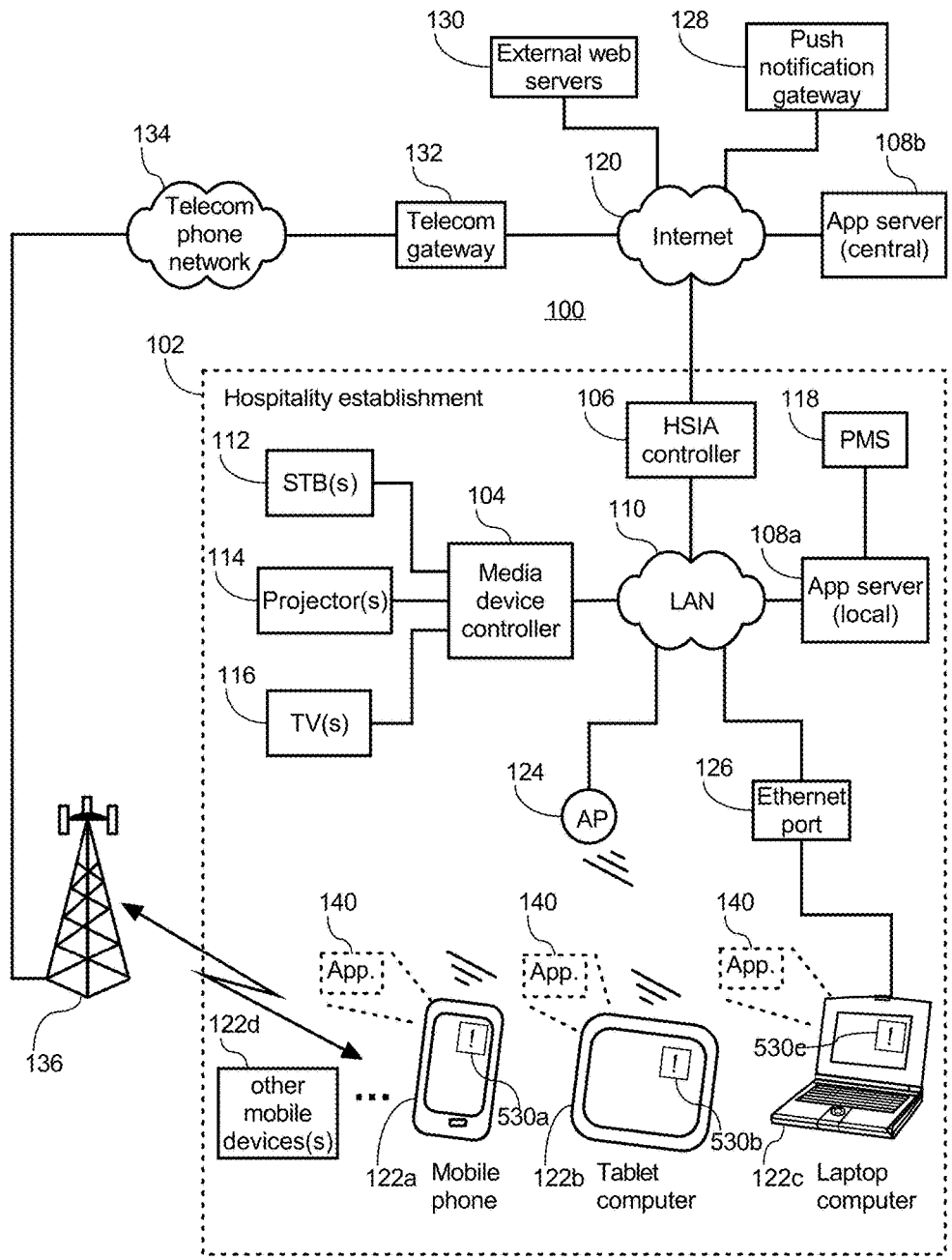
FIG. 1 illustrates a block diagram of a system for notifying a user of Internet access upgrade possibilities via a room control application running on the user's mobile device according to an exemplary embodiment of the invention.

FIG. 1 illustrates a system 100 according to an exemplary embodiment of the invention. In this embodiment, the system 100 allows guests of a hospitality establishment 102 to utilize mobile devices 122 to access multiple services offered by the hospitality establishment. To facilitate description of an advantageous usage, the hospitality establishment 102 in this embodiment is a lodging establishment such as a hotel or resort and the system 100 enables guests to utilize their personal mobile devices 122 to access at least two services offered by the lodging establishment: a) remote control of in-room devices in the user's assigned guest room and b) Internet access. It is to be understood that other embodiments with other types of hospitality establishments and services are also possible.

As shown in FIG. 1, the hotel 102 in this embodiment includes a media device controller 104, a high speed Internet access (HSIA) controller 106, and a local app server 108a coupled to a local area network (LAN) 110. The media device controller 104 is coupled to a plurality of in-room devices including set-top boxes 112, video projectors 114, and televisions (TVs) 116; the HSIA controller 106 is coupled to the Internet 120, and the local app server 108a is coupled to a property management system (PMS) 118 that manages various information at the hotel 102 such as guest room-assignments and folios.

Coupled to the Internet 120 are a push notification gateway 128, a central app server 108b, and a plurality of external web servers 130 offering what is commonly referred to as the World Wide Web. A telecom gateway 132 is also coupled between the Internet 120 and a telecom phone network 134 which may be a $3^{rd}$ or $4^{th}$ generation telecommunications mobile network for example.

One or more guests staying at the hotel 102 in this example have brought to the hotel 102 a plurality of mobile devices 122 including a mobile phone 122a, a tablet computer 122b, a laptop computer 122a, and possibly other mobile devices 122d. Employing wireless or wired connections, the mobile devices 122 are coupled to the hotel's LAN 110 via one or more wireless access points 124 and Ethernet ports 126.

A cell phone tower 136 transmits and receives wireless signals such as according to the global system for mobile (GSM) communications or another protocol and is in communication with mobile phone 122a within signal range of the tower 136. Both data and voice traffic may be carried via these cell phone signals.

Again, assuming the hospitality establishment 102 in this embodiment is a hotel, one service that is made available by the hotel 102 is remote control of in-room entertainment devices and other entertainment features such as free-to-guest (FTG) television channels, video-on-demand (VOD), and personal media streaming and sharing etc. If users so desire, they may download and install on their mobile devices 122 a software application 140 (hereinafter hotel's "app" 140) that allows the users of these devices 122 to, among other functions, remotely operate the STB 112, projector 114 and TV 116 in their assigned guest room by interacting with the user interface (UI) on the mobile device 122 running the hotel's app 140.

As shown in FIG. 1, in this embodiment there is both a local app server 108a on hotel LAN 110 and a central app server 108b on the Internet 120. The two app servers 108a,b are in communication with each other and work in tandem with each other in this configuration. Mobile devices 122 running app 140 that are not on the hotel's LAN 110 communicate with the central app server 108b via the telecom phone network 134 and/or the Internet 120; similarly, mobile devices 122 running app 140 that are on the hotel's LAN 110 communicate with the local app server 108a via the hotel's LAN 110. Local and central user profile server 108a,b may also act as redundancy/backup for the other; e.g., the apps 140 on the various mobile devices 122 may by default communicate with central app server 108b, but in the event that this is not possible because the hotel's 102 connection to Internet 120 goes down for example, the apps 140 which are running on mobile devices 122 on local LAN 110 automatically begin to communicate with local app server 108a and functionality is still available for guests at the hotel 102. Likewise, if the central app server 108b experiences a problem, mobile devices 122 on hotel LAN 110 may fall back to the local app server 108a.

In other configurations, there may only be one of the local app server 108a or the central app server 108b present in system 100. For example, assuming only central app server 108b is present, both devices on and off hotel LAN 110 communicate with the central app server 108b via the Internet 120. Having at least a central app server 108b coupled to the Internet 120 present in the system 100 is beneficial in the event that the app 140 provides functionality to users even when the user is outside of the hospitality establishment 102. Alternatively, if the app 140 only provides useful functionality while the user is at a single hospitality establishment 102, it may be beneficial to only include a local app server 108a present on the LAN 110 of that single hospitality establishment. In the following description, unless explicitly stated otherwise, reference to the local and central app servers 108a,b should be taken as example configurations whereas other configurations utilize the other the local/central app server 108a,b in a similar manner. Likewise, reference to 'the app server 108' in general should be taken to mean any of the local/central app server 108a,b depending on whether both or only one are/is present in the desired configuration of system 100.

An example usage scenario of an embodiment with reference to FIG. 1 is as follows:

By installing and running the hotel's room control app 140 on mobile phone 122a, a guest assigned to a particular room (e.g., "room 101") of the hotel 102 may change the channels and volume of the TV 116 in that particular room by interacting with the touchscreen on mobile phone 122a. The app 140 communicates with the media device controller 104 via LAN 110 in order to send commands such as "channel up" and "volume up" from the mobile phone 122a to the various in-room devices 112, 114, 116. The media device controller 104 ensures that mobile phone 122a is only able to remotely operate and control the in-room media devices 112, 114, 116 in the particular guest room of the hotel that is assigned to the user of the mobile phone 122a, i.e., "room 101" in this example. The mobile phone 122a communicates with the media device controller 104 via AP 124/Ethernet port 126 and LAN 110, or alternatively via cell tower 136 and telecom phone network 134 and back into the hotel 102 via the hotel's HSIA controller 106.

In this embodiment, when the user first installs and runs app 140 on a mobile device 122, the app 140 displays a notification permission screen on the device's 122 UI so that the user can allow push notifications for the app 140. For example, the screen may display something similar to:

"'Hotel room control app' Would like to Send You Push Notifications—Notifications may include alerts, sounds and icon badge counts. These can be configured in Settings."

In response, the user then must press either one of two buttons: "Don't Allow" or "OK".

Assuming the user enables push notifications on mobile phone 122a, the app 140 thereafter sends a push notification device token to the app server 108. The device token received from the mobile device 122 is saved by the app server 108 along with the media access control (MAC) and/or Internet Protocol (IP) address of the mobile device 122 as assigned on LAN 110. The device token identifies the mobile device 122 for use when later sending a push notification to the mobile device via push notification gateway 128.

Another service that is made available to the guests by the hotel 102 in this embodiment is Internet access. The mobile devices 122 of the user in the particular room (e.g., "room 101") are individually or as a group authorized to access the Internet 120 according to various service entitlements as controlled by the HSIA controller 106. For example, upon the guest's arrival and/or check-in at the hotel 102, the mobile devices 122 of that guest may each be given access to the Internet 120 by the HSIA controller 106 at a basic service entitlement that is offered to current guests free of charge. Alternatively, the user may perform an online login process with the HSIA controller 106 to make a payment or confirm a purchase to thereby gain access to the Internet 120 at the basic service entitlement.

As the basic service entitlement will not be sufficient for the needs of some guests, one or more additional higher service entitlement(s) with greater bandwidth allocations, support for multiple simultaneous devices per user, static global (public) IP addresses, and/or other enhanced features are also offered by the HSIA controller 106 for various predetermined monetary charges. For example, a premium Internet package may offer ten times the bandwidth of the basic service entitlement for a charge of $4.99 per day. Although the premium package(s) are available, for illustration purposes in this example, the user is assumed to initially only take the basic service entitlement.

As the user surfs the web, the HSIA controller 106 in the background monitors certain aspects of the Internet service with respect to the user's mobile device(s) 122 in order to detect one or more predetermined conditions that represents that an upgrade to a higher HSIA service entitlement may be beneficial to the user. When one of these predetermined conditions occurs, the app server 108 sends via the push notification gateway 128a a push notification message to the device token that was received from the app 140 previously running on the mobile device 122. The push notification gateway 128 in response pushes the notification message down to the app 140 and/or operating system (OS) running on the mobile device 122 identified by the device token. The content of the push notification messages includes an invitation for the user to upgrade their Internet service entitlement to a higher level. Links, buttons and/or instructions for how this upgrade can be initiated may also be included.

Assuming the app 140 is not running at the time, the OS on the mobile device 122 receives the push notification message from gateway 128 and alerts the user to the presence of the new message through one or more push notification alert indicators 530*a,b,c*, which may include text messages, pop-up windows, icons, badges and counts, audio tones, vibrations, or any other mechanism as supported by the mobile device and configured by the user in the app 140's and/or the OS's setup screens.

In this way, if the user attempts to stream a movie on the Internet 120 to mobile phone 122*a* while on the basic service entitlement, the mobile phone 122*a* will reach (or come within a threshold of) the bandwidth limit of the basic service entitlement. The HSIA controller 106 detects this condition and sends a push notification message to the mobile phone 122*a* via the push notification gateway 128 inviting the user to upgrade to the premium Internet package. The OS running on the mobile device alerts the user of the mobile phone 122*a* to the existence of the push notification message in real-time as soon as the message is received by displaying an alert window 530*a* regardless of whether or not the hotel's app 140 is currently running. By the user clicking or otherwise opening the displayed alert 530*a*, the app 140 either presents an Internet control panel for the user or opens a new window in the user's web browser at the URL of the hotel's HSIA welcome web page thereby allowing the user to upgrade their Internet access service entitlement. An advantage is that the system 100 leverages the push notification capabilities of hotel's app 140 to also send event-triggered invitations to upgrade the guest's Internet access at the hotel 102.

Figure 2:
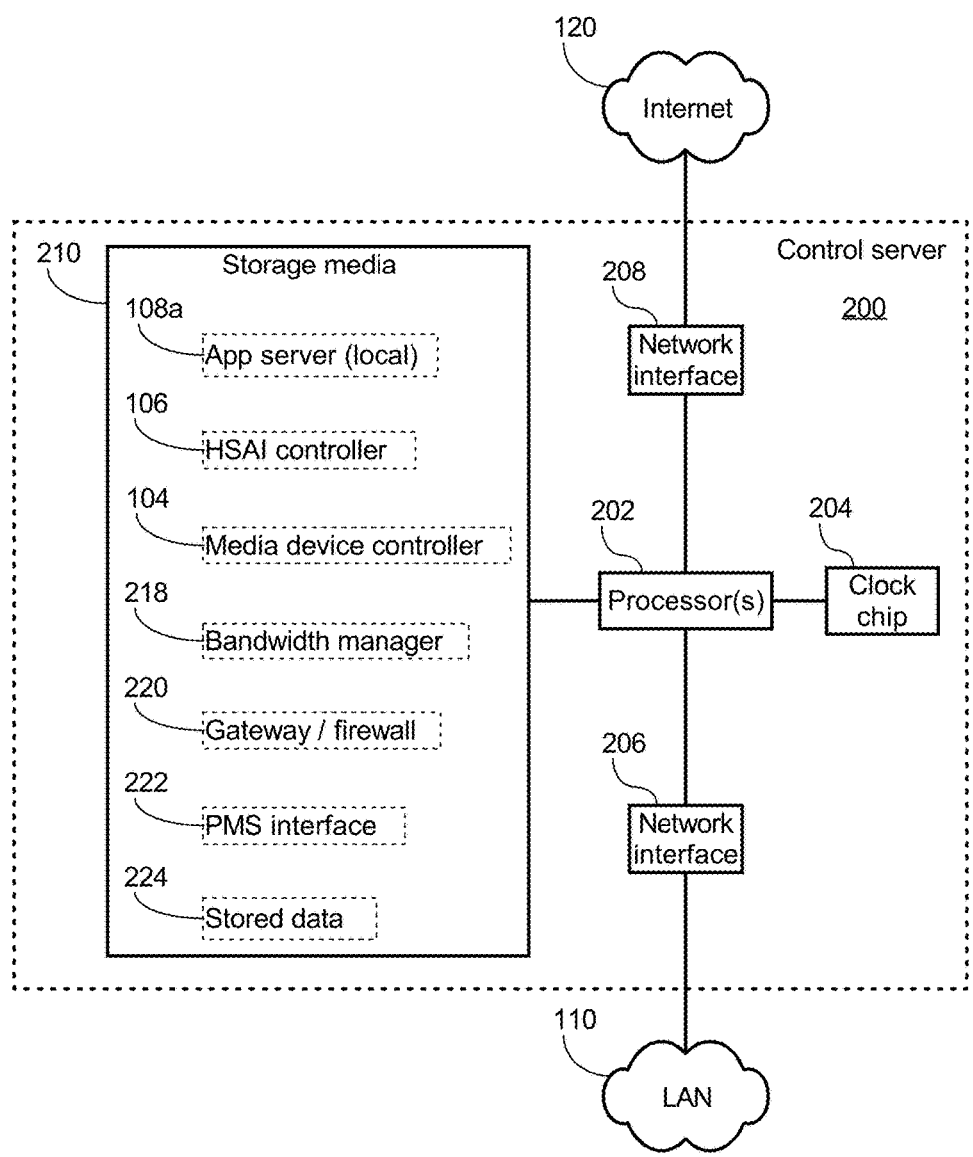
FIG. 2 shows a block diagram of a control server for implementing the media device controller, the high speed Internet access (HSIA) controller, and the local app server of FIG. 1.

FIG. 2 shows a block diagram of a control server 200 implementing the combined functionality of the media device controller 104, the HSIA controller 106, and the local app server 108*a* of FIG. 1. In this embodiment, the control server 200 is a computer sever including one or more processor(s) 202, a clock chip 204, a first network interface 206 coupled to the LAN 110, a second network interface 208 coupled to the Internet 120, and storage media 210 such as hard disk drives, random access memory (RAM), and/or flash storage device(s). The storage media 210 stores various software modules including modules for performing functions of the app server 108, an HSIA controller 106, and a media device controller 104 of FIG. 1 in addition to other complementary functionality of a bandwidth manager 218, a gateway/firewall 220, and a PMS interface 222. The storage media 210 also stores a variety of stored data 224 that is utilized by the various modules 212, 214, 216, 218, 220 when performing their functions. In the following description the plural form of the word "processors" is utilized as it is common for a CPU of a computer server to have multiple processors 202 (sometimes also referred to as cores); however, it is to be understood that a single processor 202 may also be configured to perform the described functionality in other implementations.

FIG. 3 shows a portion of the stored data 224 in storage media 210. In this example, the illustrated portion is organized as a database table including a separate row for each different mobile device 122. A "MAC address" column 300 stores the MAC address of the mobile device 122; an "IP address" column 302 stores the IP address currently assigned to the mobile device 122 on hotel LAN 110; a "user identifier" column 304 stores the loyalty program member identifier or another user identifier corresponding to the user who is operating the mobile device 122; a "device token" column 306 identifies the mobile device for use when sending a push notification message related to app 140 via the push notification gateway 128; and a plurality of "HSIA service" columns 308 store settings related to the Internet service that is currently applied to the mobile device 122 by the HSIA controller 106.

The HSIA service settings 308 in this example include a "login expiry" column 310 storing the date and time that the mobile device's entitlement to the Internet will be cut off by the HSIA controller 106; a "service entitlement" column 312 storing the entitlement level (i.e., either "Free" or "Premium" in this example); a "max number of devices" column 314 storing the number of mobile devices 122 that the user is entitled to simultaneously access the Internet 120; and a "bandwidth allocation" column 316 storing the maximum download bandwidth to which the mobile device 122 is entitled. Other columns (not shown) may also be stored such as a "room number" column storing the hotel guest room number to which the user of the mobile device is currently assigned at hotel 102 and/or an "upload bandwidth allocation" storing the maximum upload bandwidth to which the mobile device 122 is entitled if it is different than the download entitlement.

In this embodiment the system only supports a single push notification system; however, another column (not shown) in FIG. 3 may store the type of push notification system to use for a particular mobile device according to different identifiers for different push notification system types. Examples of different push notification systems include those for use with different brands of operating system such as iOS®, Android®, Blackberry®, Windows Metro®, etc. Each mobile device 122 may support a different push notification system according to its brand and/or OS type, and a "Push notification type" column may be added to FIG. 3 in that event that system 100 supports multiple types of push notification systems.

In this description, push notification system refers to the various separate elements that together allow push notifications to be delivered to a mobile device 122 of a particular brand. For example, in Apple's iOS push notification system there are elements of the push notification system running within the OS of the mobile device 122 as well as an external Apple Push Notification Server (APNS), for example, push notification gateway 128 in FIG. 1. The Apple iOS push notification system also requires network or other communication path(s) between the app server 108 to the push notification gateway 128 to the mobile device 122 identified by the device token. For example, as shown in FIG. 1 the communications paths are provided in this embodiment by the Internet 120, telecom phone network 134 and/or hotel LAN 110 in FIG. 1. As the technical details of various push notification systems for different brands and types of mobile devices 122 are well known, further details are omitted herein for brevity.

Figure 4:
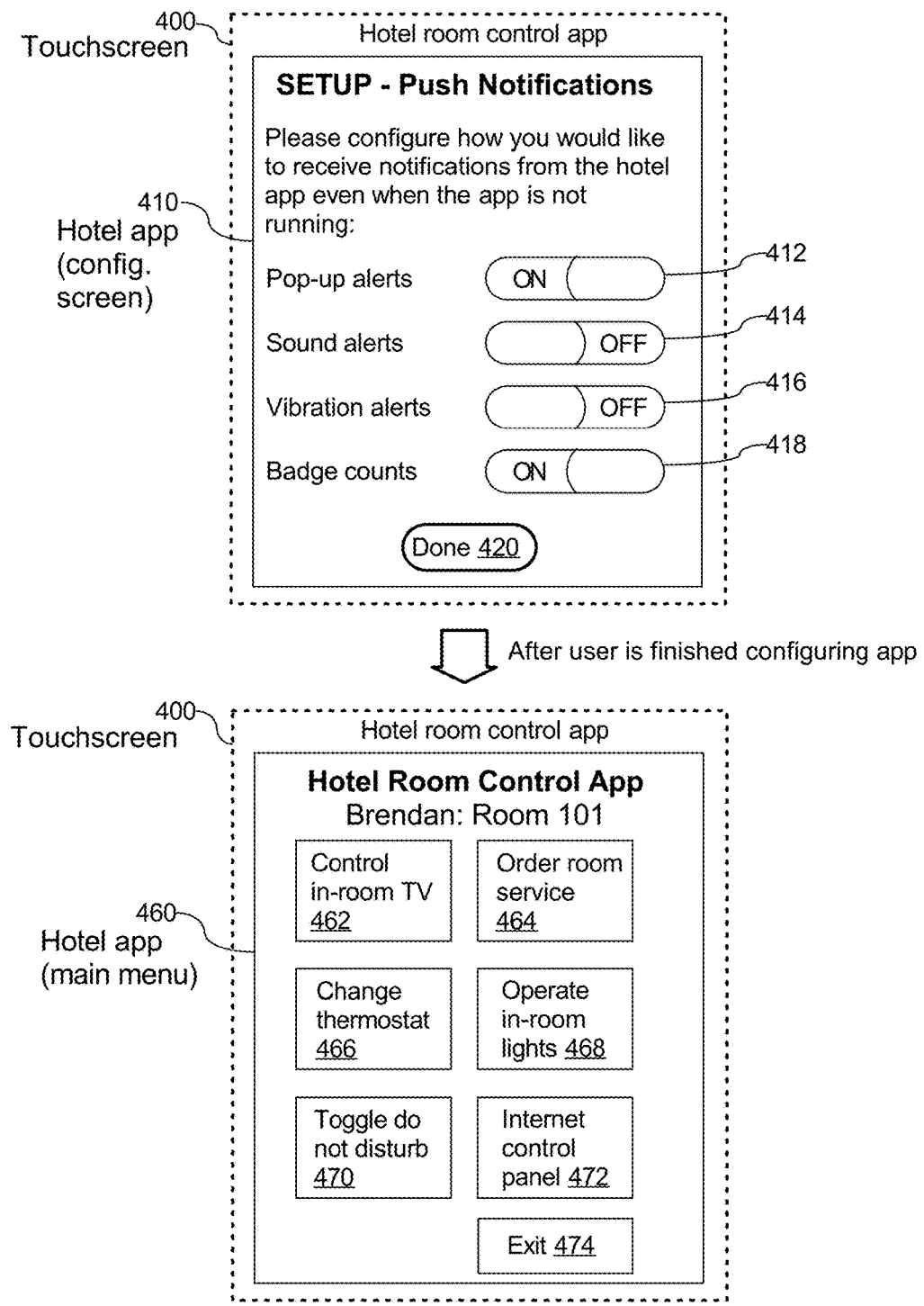
FIG. 4 illustrates a push notification setup displayed on a screen of a mobile device when the hotel's room control app is initially run according to an exemplary embodiment of the invention.

FIG. 4 illustrates a push notification setup displayed on a screen 400 of a mobile device 122 when the hotel's room control app 140 is initially run according to an exemplary embodiment of the invention. For the following description, it will be assumed that the screen 400 is a touchscreen and the mobile device is mobile phone 122*a*. The user may both see and make changes to the settings using touchscreen 400; for example, the user may change settings by swiping or pressing the user's fingers against the touchscreen 400. On other types of mobile devices 122 without touchscreens, a similar screen may also be displayed and interacted with by the user utilizing other UI controls such as physical keyboards and buttons.

As illustrated in FIG. 4, the touchscreen 400 displays a setup window 410 of the hotel's room control app 140. The setup window 410 is presented to the user upon the first time the app 140 is run after being installed on the mobile phone 122a. One reason to present the push notification setup window 410 upon initial run is to allow the user to verify that push notifications are desired and allow the desired alert types to be configured. Some users may wish to deactivate one or more forms of push notification alerts for privacy reasons or simply due to personal preference such as to avoid interruptions while working. In another embodiment, the push notifications may be configured by default to visual only (i.e., pop-up alerts 412 and badge counts 418) upon initial installation without presenting the setup window 410 to the user. The user may only need to verify that they are agree to receive push notifications at initial run and the app 140 will assume the default types of push notification messages are okay.

In preferred embodiments, the user may at any time enter the push notification setup window 410 to change the notification settings for the hotel's app 140. The app 140 enables the user to open window 410 by providing a "Notifications" button within the app's preferences or other configuration screens (not shown). Upon the user selecting the "Notifications" button, the push notification setup window 410 is presented allowing the user to confirm and/or change the notification settings.

After the user has configured the push notifications, the user presses the "Done" button 420 to save the changes. Once the settings are saved in a storage device within mobile phone 122a, the OS on the mobile phone 122a will notify the user of any incoming push notifications related to app 140 as received from push notification gateway 128 according to these saved settings.

Further configurations of the hotel's room control app 140 may also been performed in other windows (not shown) before or after the push notification setup window 410. Examples of other configurations that may be desired include allowing the user to associate the app 140/mobile device 122 with a particular hotel room by any suitable method such as via a connect code displayed on the in-room TV 116, by verifying user information entered into the app 140 to determine whether it matches information of the guest currently assigned to the room as stored in the hotel's PMS 118, or by tracing network traffic sent from the mobile device 122 back to its originating room within the hotel 102 according to its source access point 124 and/or source Ethernet port 126 which are mapped to a particular room in a network map. These and other methods of associating a mobile device 122 to a hotel room are described in further detail in U.S. Patent Application Publication No. 20130346564, published on Dec. 26, 2013 and entitled, "DYNAMICALLY ENABLING GUEST DEVICE SUPPORTING NETWORK-BASED MEDIA SHARING PROTOCOL TO SHARE MEDIA CONTENT OVER COMPUTER NETWORK WITH SUBSET OF MEDIA DEVICES CONNECTED THERETO", which is incorporated herein by reference. Location detection may also be utilized to detect in which the room or area of the hotel 102 the mobile phone 122a is located such as by triangulating wireless signals between multiple access points (APs) 124.

The lower portion of FIG. 4 illustrates the output of the mobile phone 122a's touchscreen 400 while showing a main menu window 460 of the hotel room control app 140. The user may select any of buttons 462, 464, 466, 468, 470, 472 to remotely control a number of different in-room devices 112, 114, 116 associated with the user's room and/or interact with other services offered at the hotel 102. For example, after the user presses the "control in-room TV" button 462, the app 140 causes a subsequent window (not shown) to be displayed allowing various controls such as "channel up", "channel down", "volume up", "volume down", etc. In this manner, the user may utilize their own mobile phone 122 of which they are likely very comfortable operating to also control other devices in the hotel such as their in-room STB(s) 112, projector(s) 114, and/or TV(s) 116. Other hotel devices and functionality may also be remotely controlled via app 140 in a similar manner; for example, the user may press button 464 to order room service, button 466 to remotely change the room's thermostat, button 468 to turn on and off the in-room lights, and button 470 to toggle their room's external 'do not disturb' sign. Further details on how the room control app 140 may communicate with and control various hotel devices 122 are further described in U.S. Patent Application Publication No. 20110298596, published Dec. 8, 2011 and entitled, "METHOD OF OPERATING ONE OR MORE CONTROLLABLE DEVICES IN DEPENDENCE UPON COMMANDS RECEIVED FROM A MOBILE DEVICE AND SYSTEM CONTROLLER THEREOF", which is incorporated herein by reference.

Figure 5:
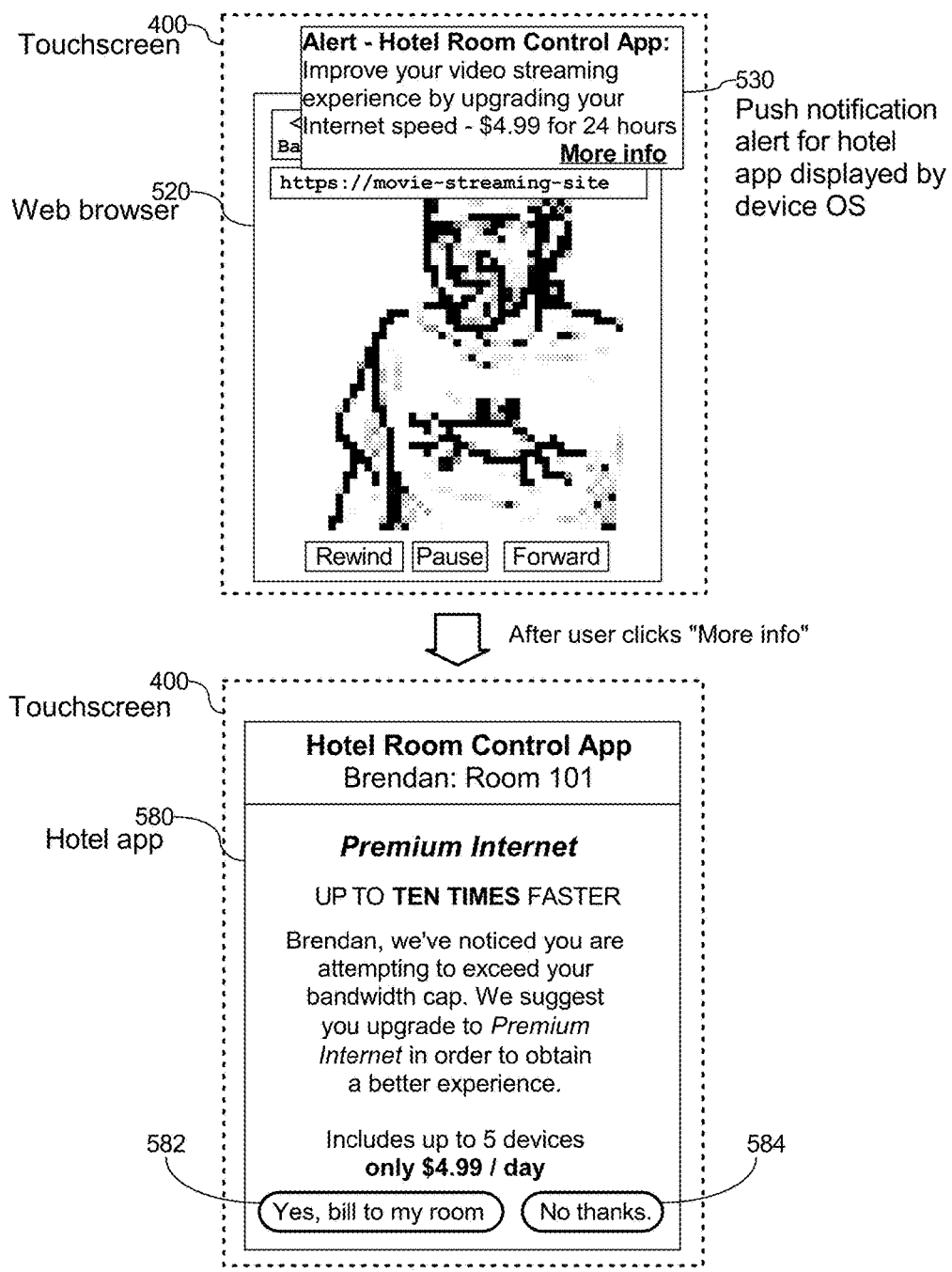
FIG. 5 illustrates the contents of the screen while the user is attempting to stream an online video using a web browser application while at an insufficient Internet access service entitlement.

FIG. 5 illustrates the contents of the touchscreen 400 when the user attempts to stream an online video using a web browser application running on mobile phone 122a while at the basic service entitlement. Web browser applications often come pre-packaged with the operating system (OS) of a mobile device 122 or may be downloaded from an app store and are separate from the hotel's app 140 in this embodiment.

In this embodiment, the hotel's HSIA service is independent from the hotel's custom app 140 in the sense that a mobile device 122 is not required to install and run the hotel's room control app 140 in order for the mobile device 122 to access the Internet 120. Both mobile devices 122 that have installed but are not currently running the hotel's room control app 140 and other mobile devices 122d that do not have the hotel's room control app 140 installed may run a web browser or other Internet-accessing application and take advantage of the hotel's HSIA service in order to access the Internet 120. In other words, the hotel 102 does not require its guests to install or run room control app 140 in order to access the Internet 120 from their mobile devices 122.

In this embodiment, when a user first attempts to access an external web server 130, user authentication and Internet access package selection and/or purchases are handled by the HSIA controller 106 using well known captive portal techniques. For example, the HSIA controller 106 may employ HTTP redirection response status codes of the form 3XX in order to redirect users to a login screen when they first attempt to browse to an external web server 130. URL redirection employing browser redirection via an intermediate gateway device is described in U.S. Pat. No. 6,636,894 B1 issued Oct. 21, 2003 and entitled, "SYSTEMS AND METHODS FOR REDIRECTING USERS HAVING TRANSPARENT COMPUTER ACCESS TO A NETWORK USING A GATEWAY DEVICE HAVING REDIRECTION CAPABILITY"; and U.S. Pat. No. 7,689,716 B2, issued Mar. 30, 2010 and entitled, "SYSTEMS AND METHODS FOR PROVIDING DYNAMIC NETWORK AUTHORIZATION, AUTHENTICATION AND ACCOUNTING". Both of these patent documents are incorporated herein by reference.

Alternatively, techniques that do not require a browser redirection message may be utilized such as those described in U.S. Pat. No. 8,650,495, issued Feb. 11, 2014 and entitled "CAPTIVE PORTAL THAT MODIFIES CONTENT RETRIEVED FROM DESIGNATED WEB PAGE TO SPECIFY BASE DOMAIN FOR RELATIVE LINK AND SENDS TO CLIENT IN RESPONSE TO REQUEST FROM CLIENT FOR UNAUTHORIZED WEB PAGE", which is incorporated herein by reference. Or DNS based approaches may be utilized such as those described in U.S. Patent Application Publication No. 20140344890 published Nov. 20, 2014 and entitled, "DNS-BASED CAPTIVE PORTAL WITH INTEGRATED TRANSPARENT PROXY TO PROTECT AGAINST USER DEVICE CACHING INCORRECT IP ADDRESS", which is incorporated herein by reference.

Further, free websites may be made accessible by the HSIA controller 106 even for non-logged in mobile devices 122 using the techniques described in U.S. Pat. No. 8,448,231, issued May 21, 2013 and entitled, "WALLED GARDEN SYSTEM FOR PROVIDING ACCESS TO ONE OR MORE WEBSITES THAT INCORPORATE CONTENT FROM OTHER WEBSITES AND METHOD THEREOF", which is incorporated herein by reference.

In this example it is assumed that the HSIA controller 106 allows users to select and optionally purchase one of two Internet packages: a basic package that is limited to low speeds suitable for checking email and basic web browsing, and a premium package that is charged on a daily basis that is ten times faster and suitable for streaming movies from online services such as YouTube®, Netflix®, Hulu® and the like. For illustration purposes it is also assumed that the user's mobile phone 122a in this example is currently only entitled by the HSIA controller 106 to access the Internet 120 at the basic service entitlement.

As shown in the top portion of FIG. 5, despite only being entitled to the low bandwidth of the basic Internet package, the user of the mobile phone 122a is attempting to stream a movie from an online content provider. To perform this action, the user has opened web browser window 520 and navigated to an HTTPS URL of a movie streaming site. With reference to FIG. 1, data corresponding to the streamed movie is therefore sent from the content provider (e.g., one of external web servers 130) to mobile phone 122a via the hotel's HSIA controller 106 and LAN 110. As shown, the movie is highly pixelated and may also be stuttering due to frequent buffering of video data. The reason for these quality problems in this example is that the basic service entitlement of the mobile phone 122a is capped at a low bandwidth by the HSIA controller 106 so the data for the movie cannot be streamed to mobile phone 122a at a rate high enough to support acceptable video quality.

The HSIA controller 106 working in tandem with the bandwidth manager 218 detects that the mobile phone 122a is trying to exceed (or is near its bandwidth cap) for the basic Internet package. Upon detecting this condition, the HSIA controller 106 transmits a message to communicate this condition being met to the app server 108 along with the MAC/IP address of the mobile phone 122a. The app server 108 finds the device token previously received from the app 140 on the mobile phone 122a and sends a corresponding push notification message addressed to this device token via push notification gateway 128.

Taking the case where the HSIA controller 106 transmits the message to the local app server 108a implemented by the controller server 200 in FIG. 2, the local app server 108a may find the device token of the mobile phone 122a by searching the stored data 122 as shown in FIG. 3 according to the IP or MAC address of the device that is attempting to exceed its bandwidth as reported by the HSIA controller 106. For example, assuming the IP and/or MAC address of the device 122 that triggered the bandwidth message from the HSIA controller 106 are "MAC-1" and "IP-1", by searching for the row of stored data table 122 having either or both of these values in columns 300/302 the local app server 108a finds the device token in column 306 of that row (e.g., "Token-1" in this example).

After finding the device token of the mobile phone 122a, the app server 108 sends a push notification to this device token via push notification gateway 128. The push notification gateway 128 then sends the notification down to the mobile device 122 via either the hotel's LAN 110 or the telecom phone network 134, and the OS or app 140 running on the mobile device presents a visual or other alert 530 of the incoming notification message to the user according to the push notification settings previously configured by the user with UI screen 400a in FIG. 4.

The actual protocol, message format, and operations required by the push notification gateway 128 will depend upon the specific requirements of the push notification system(s) selected for use at hotel 102. As long as the various requirements are known in advance, the app server 108 can be implemented in a way that is compatible with the external push notification gateway(s) 128's requirements for any number of different push notification systems. Similarly, the mechanism that the hotel's room control app 140 utilizes to obtain the device token for the mobile device 122 on which it is currently running is also dependent upon the specific push notification system in use. One example of an external push notification system is Apple Inc.'s push notification gateway for iOS® devices known as Apple Push Notification Services (APNS). Apple provides to developers the format, operation and programming guides, and other requirements of APNS. Similar functionality and associated documentation is provided by other external vendors such as to use push notifications systems for Blackberry®, Android™, Windows Metro™ and other brands and types of mobiles devices 122. As these push notification system are well documented elsewhere, further description of the actual mechanism of how the app 140 obtains the device token and how the push notification gateway 128 sends the push notification message to the mobile device 122 identified by the device token is omitted herein for brevity.

As shown in the top portion of FIG. 5, a result of the push notification sent to the device token of the mobile phone 122a by app server 108 via push notification gateway 128 is that the OS on the mobile phone 122a alerts the user in real-time to the incoming push notification message even when app 140 is not currently running. In this embodiment, push notification alerts are done by the OS of the mobile phone 122a displaying a text-based notification window 530 in the upper right hand corner of touchscreen 400 over top of whatever was previously displayed at that position just before the notification message was received. Other types of alerts may also be done as previously configured by the user in the push notification configuration screen 410 for the hotel's room control app 140 as shown in FIG. 4.

In this embodiment, the alert for the push notification message displayed in window 530 includes a summarized invitation for the user to upgrade from the basic Internet package to the premium Internet package. As a result, the user is immediately made aware of the possibility of upgrading their Internet access package at the hotel 102 at the very time when the user is likely to benefit from upgrading their Internet access. Beneficially, the notification alert in this embodiment is displayed in real-time to the user as soon as it is received from push notification gateway 128. There is therefore a high probability that the user in this example is still attempting to stream the online movie (the condition that triggered the notification in this example) and is already aware that the current speeds of the basic Internet package are too slow for acceptable quality. In some situations, the push notification gateway 128 may delay delivery of the push notification message for some period of time such as up to thirty minutes, but a delayed notification of the possibility to upgrade is still better than no notification at all. In any case, in a preferred embodiment, the OS or app 140 running on the user's mobile device 122 is configured to alert the user to a new push notification message as soon as it is received at the mobile device 122.

The bottom portion of FIG. 5 illustrates what happens after the user clicks the "More info" link in the notification alert window 530. Because the notification alert window 530 is displaying a push notification message related to the hotel's room control app 140, when the user clicks the "More info" link, the OS on the mobile phone 122 opens the room control app 140 in a new window 580. The hotel app 140 then receives the push notification message and presents a more detailed information screen for the notification message explaining benefits of upgrading to the premium Internet along with the price and buttons 582, 584 that the user can click to either accept or decline the upgrade invitation. If the user clicks the "No" button 584, the app 140 may simply close and the user will be back in their web browser. Alternatively, if the user clicks the "Yes" button 582, the app 140 will send a message to the app server 108 to upgrade the user's HSIA service entitlement at hotel 102.

In this configuration, the upgrade is performed by the app server 108 dynamically reconfiguring the HSIA controller 106 by modifying the user's settings in columns 308 of FIG. 3. In some embodiments, the user's upgraded service entitlement may apply only to mobile phone 122a; in other embodiments, the user's upgraded service entitlement may apply to all currently logged in user devices 122 by the same user. The user identifier stored in column 304 may be utilized by the app server 108 to find all the various mobile devices 122 that are associated with the user who has performed the HSIA service upgrade. Whether upgrades apply to only one device or all of the user's devices can be a hotel specific configuration setting.

Because the upgrade involves charging the user a fee, the app server 108 also posts a charge to the user's currently assigned hotel room by communicating with the hotel's PMS 118. For example, the local app server 108a firstly queries the PMS 118 to find which guest room at the hotel 102 is associated with the user identifier in column 304 for the mobile phone 122a that has just upgraded. The local app server 108a secondly adds the charge for the premium Internet package to the guest room. In this way, when the user later checks out of the hotel 102, the premium Internet package will be included in the room's folio and can be billed to the guest's credit card assuming there are no disputes. In another example where the establishment 102 is a restaurant, the local app server 108a may add the charge to the bill associated with the user's table, or any other area or location at hospitality establishment 102 that is associated with the user such as a conference or meeting room, seat number, etc. in various other examples.

In other embodiments, rather than adding the charge for the Internet upgrade to the user's bill, the charge may be billed in real-time to the user's credit card, which may already be on record and stored within app server 108 or PMS 118, or may be entered by the user into app 140 in a subsequent window (not shown) that appears after the user presses the "Yes" button 582. Such embodiments where the user's credit card bill is charged and the payment is verified in real-time may be more appropriate for types of hospitality establishment 102 that do not bill the user at the end of their stay. For example central app server 108b may bill the user's credit card by communicating with a credit card processor gateway server (not shown) coupled to the Internet 120. Other types of electronic payment services such as PayPal® may be utilized to bill and/or accept payment from the user in the similar way. The type of billing process(es) available at a particular hotel 102 may be a hotel specific configurable setting and may be different at different hotels 102.

Figure 6:
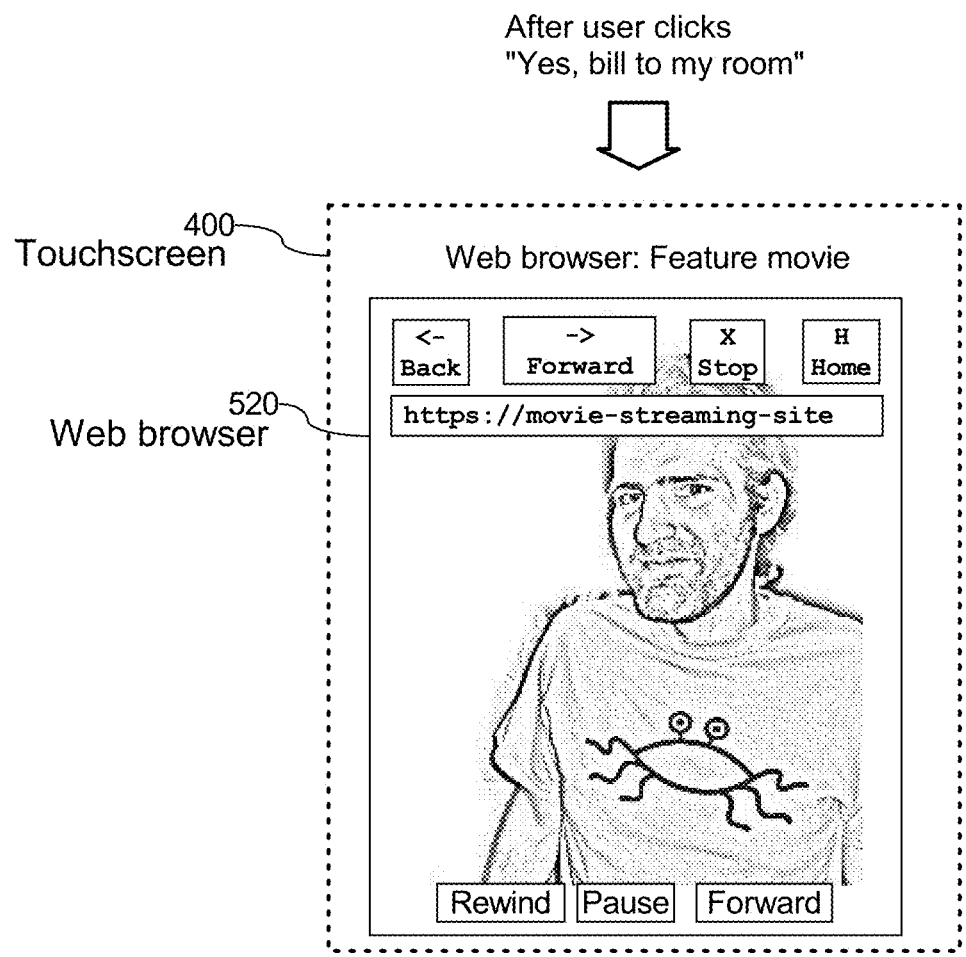
FIG. 6 illustrates the touchscreen of the user's mobile phone after the user has completed the upgrade in response to receiving the push notification message.

FIG. 6 illustrates the touchscreen 400 of the user's mobile phone 122a after the user has completed the upgrade in response to receiving the push notification message 530, such as after pressing the "Yes" button 582 provided by hotel app 580. Because the user has now upgraded to the premium Internet package with sufficient bandwidth to stream online videos, the movie the user was previously trying to stream is now watchable in its proper quality in web browser window 520.

In some embodiments, the bandwidth allocation upgrade is dynamically performed by the HSIA controller 106 by reconfiguring bandwidth manager 218 to raise the cap for the mobile phone 122a without cutting off the user's existing web session. In this manner, the movie that was previously barely streaming or was stuck "buffering" will suddenly begin to play properly after the user accepts the upgrade invitation by pressing "yes" button 482. This is beneficial to not break any TCP or other protocol connections that the mobile phone 122a may already have established with other web servers 130 on the Internet 120. In other embodiments, the user's existing network session at the basic level may be stopped and then restarted at the premium level and this might disconnect the user's previous TCP connections. Whether the upgrade is seamless or involves restarting the session may be a hotel-specific configuration setting.

Figure 7:
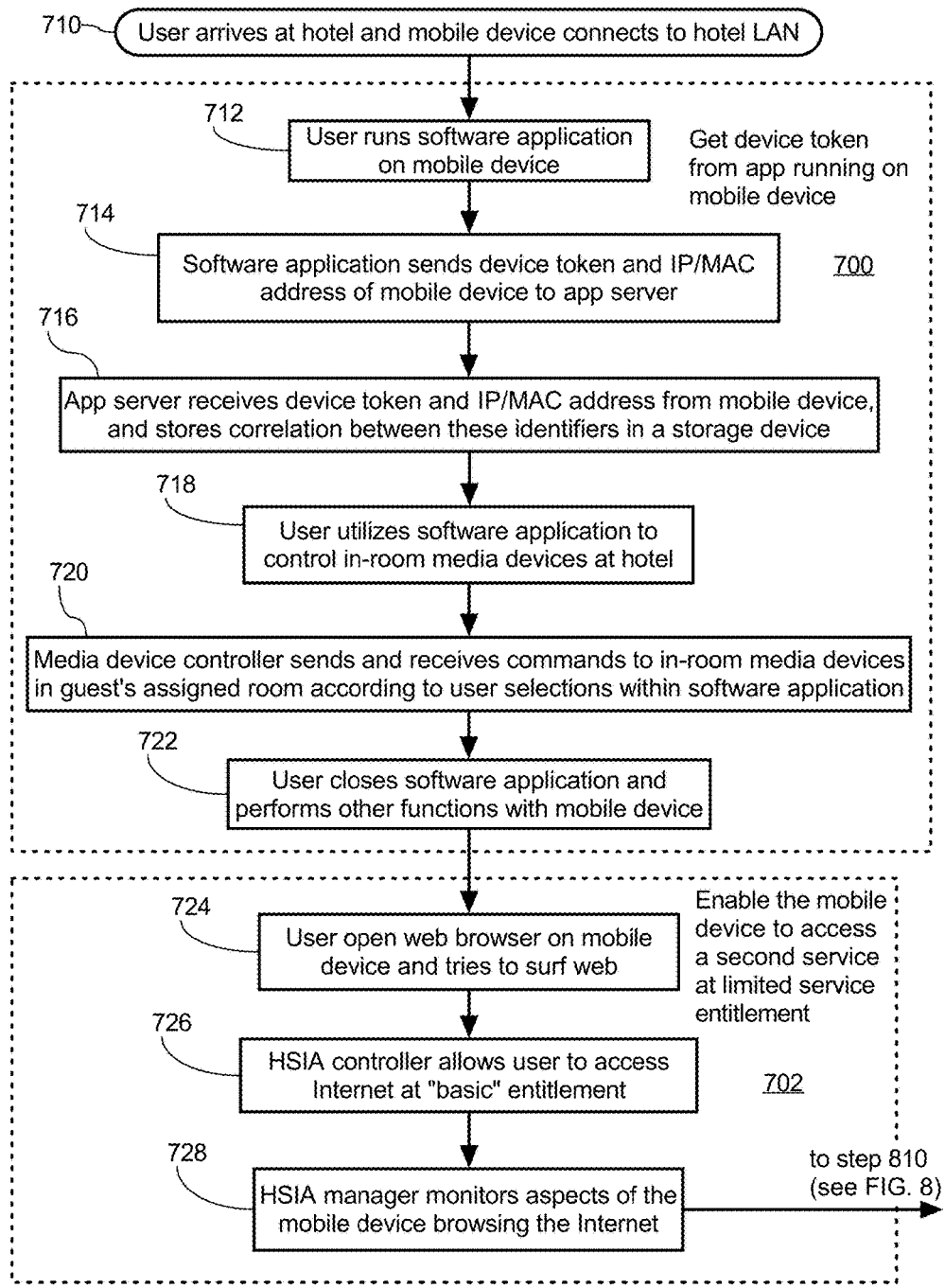
FIGS. 7, 8 and 9 together illustrate a flowchart describing a method of how the system of FIG. 1 leverages the push notification capabilities of the hotel's room control app to also send event-triggered invitations to upgrade the HSIA service entitlement in response to detecting that a user may benefit from such an upgrade according to an exemplary embodiment of the invention.
Figure 8:
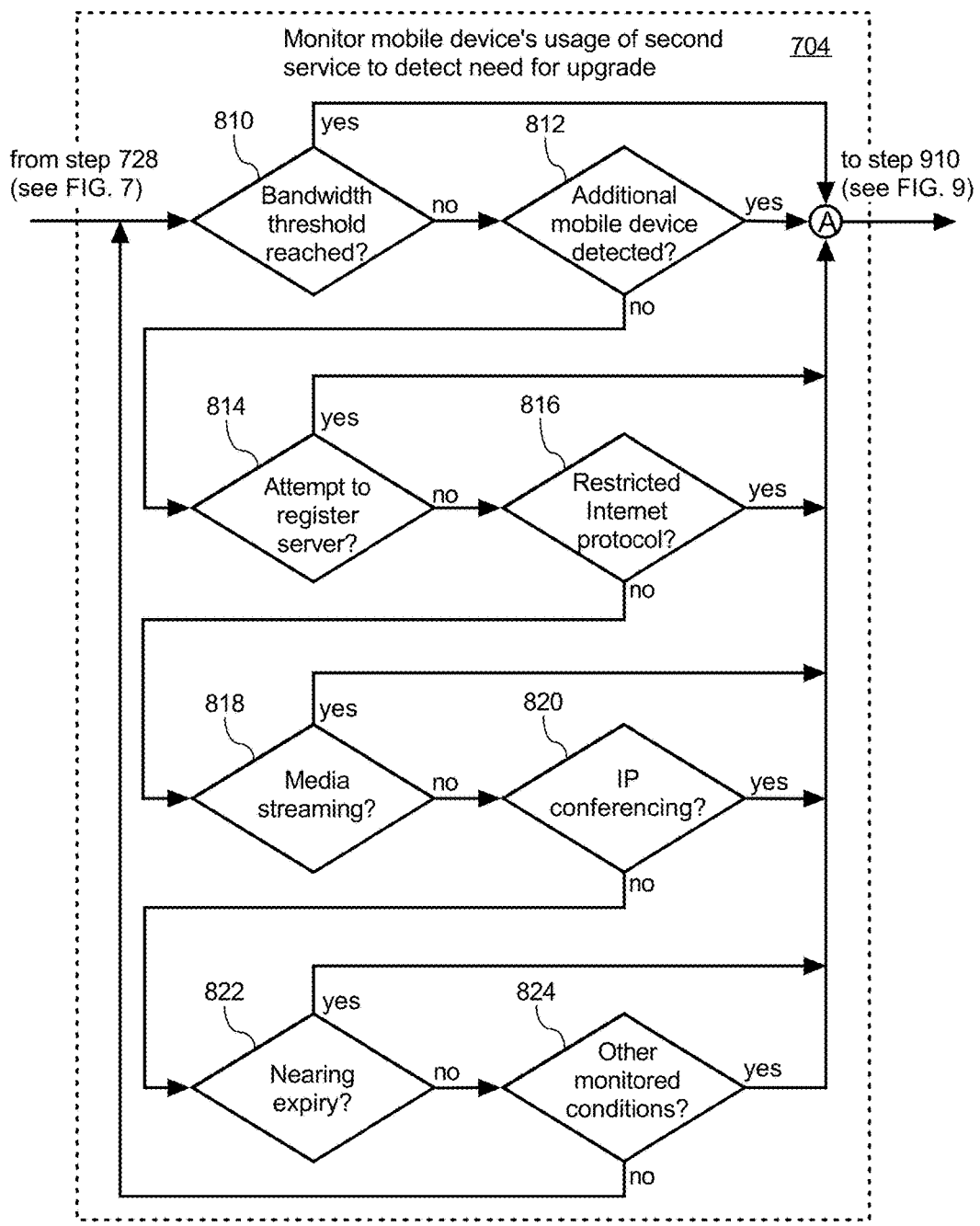
Figure 9:
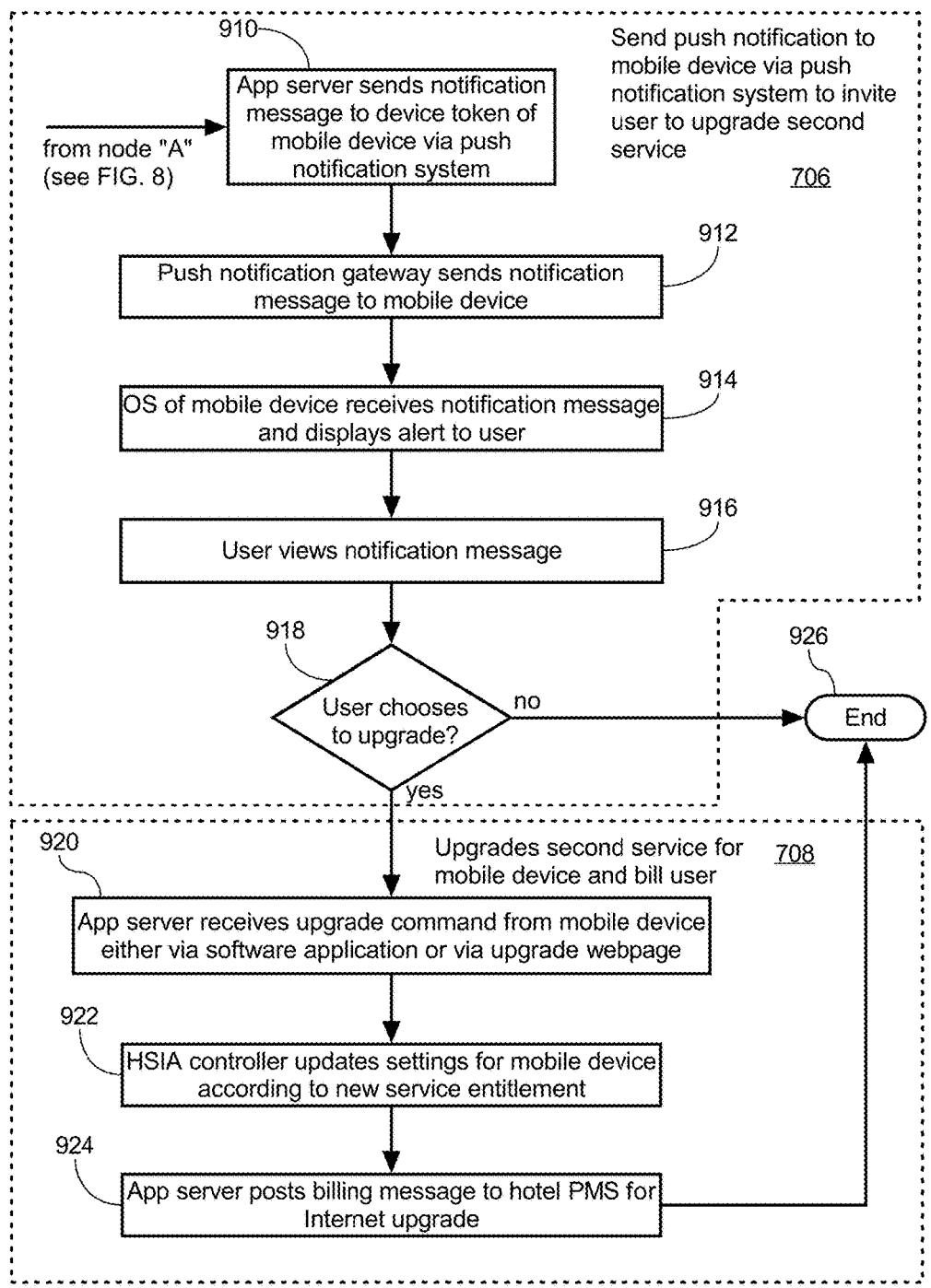

FIGS. 7, 8 and 9 together illustrate a flowchart describing how the system 100 leverages the push notification capabilities of the hotel's room control app 140 to also send event-triggered invitations to upgrade the HSIA service entitlement in response to detecting that a user may benefit from such an upgrade. The steps of the flowchart are not restricted to the exact order shown, and, in other configurations, shown steps may be omitted or other intermediate steps added. In this embodiment, the system operates as follows:

Steps 700: Receive a device token from an app 140 running on a mobile device 122 for a first service offered by the hospitality establishment 122. The device token identifies the mobile device for sending push notifications to the app 140 via a push notification system.

Steps 702: Enable the mobile device 122 to access a second service offered by the hospitality establishment at a limited service entitlement.

Steps 704: Monitor the usage of the second service by the mobile device in order to detect a predetermined condition that indicates that the mobile device may be benefit from the gaining access to the second service with an upgraded service entitlement.

Steps 706: Send a notification message to the device token via a push notification gateway 128 in order to invite the user of the mobile device 122 to upgrade the service entitlement at which the mobile device 122 can access the second service.

Steps 708: When the user accepts the invitation, upgrade the second service for the mobile device and bill the user for the upgrade.

These upper level steps are broken down into more specific individual steps explained in further detail below. For convenience of explanation, a description of a beneficial use case scenario will continue to focus on the hospitality establishment 102 being a hotel and will address the system 100 with respect to the mobile phone 122*a* illustrated in FIG. 1; however, it is to be understood that similar steps may also be performed at other types of hospitality establishments 102 and simultaneously with a plurality of types of mobile devices 122 at each establishment 102.

In FIG. 7, the collection of steps 700 and 702 of the flowchart may be performed by one or more processors (not shown) of the mobile device 122 and the one or more processors 202 of the control server 200 as indicated below. Alternatively, the steps may be performed by another device different than specified below such by one or more processors of the central app server 108 shown in FIG. 1.

At step 710, the method of this embodiment begins when a user arrives at the hotel and their mobile phone 122*a* connects to hotel LAN 110 via either AP 124 or Ethernet port 126.

At step 712, the user runs the hotel's room control software app 140 on the mobile phone 122*a*. This step may involve the user downloading and installing the app 140 from an app store or another location such as the hotel's website. A QR Code® [QR Code is a register trademark of Denso Wave Incorporated] providing the user with a link to the location of the app 140 on the app store is displayed to the user via the in-room TV 116 in this embodiment. The user can take a picture of the QR code and their mobile device will thereby capture the URL of the app 140 for immediate download and installation.

The QR code displayed to the user on the in-room TV 116 may simultaneously include both a URL for the app store where the room control app 140 can be downloaded along with a unique connect code or other passkey for the hotel room or TV 116 on which the QR code is displayed for correlating the mobile phone 122*a* to that room or TV 116 once the app is running. For example, the URL encoded by the app can comprise something similar to: https://app-store.example.com?app_id=34325&connect_code=234567, where the URL of 'app-store.example.com' is the app store's web site address, the variable 'app_id' identifies the hotel's room control application for download from the app store, and the 'connect_code' variable is ignored by the app store web server 130 but is later parsed by the app 140 running on the mobile phone 122*a* when the user takes a picture of the QR code from within the app 140 in order to associate their mobile device with the room and or media devices in the hotel 102 that are associated with the unique connect_code. Basically, if app 140 captures a QR code that has a connect_code parameter, the app 140 ignores redirecting the user to the app store and simply runs the authentication attempt to associate with a particular hotel room (or output device) according to that connect_code.

Once the app is running, control proceeds to step 714.

At step 714, the hotel's room controller app 140 sends the push notification device token and MAC address of the mobile phone 122*a* on which it is running to the local app server 108*a*. This step may involve the app 140 internally communicating with the OS running on the mobile phone 122*a* and/or the push notification gateway 128 in order to obtain the device token.

The way the device token is assigned depends on the specific push notification system(s) for which the mobile app 140 is designed to interoperate. For example, with some push notification systems, the OS may already be in communication with a central push notification gateway 128 via either an available hotspot (e.g., AP 124) or via a telecom phone network's data plan (e.g., cell tower 136). The OS may therefore detect a request from the app 140 to obtain a device token and assign one to target app 140, which then reports the assigned device token to the app server 108 at this step. The OS, the push notification gateway 128, and/or the app 140 may generate a unique device token that identifies the mobile phone 122*a* from all other mobile devices 122 in communication with the gateway 128. The device token may also include an app identifier portion and/or a user identifier portion that respectively identify the hotel room control app 140 from other types of apps that may receive push notifications and the specific user of the mobile phone 122*a* from other users of other mobile devices 122. As the specific details of the device token for use pushing notifications related to app 140 are well known for various push notification systems, further details of the generation, assignment and/or registration of the device token is omit herein for brevity. Suffice it to say that there is a device token for sending push notification messages related to the app 140 on mobile phone 122*a* and this device token is passed from app 140 to the local app server 108*a* at step 714.

At step 718, the user utilizes the hotel's room control app 140 to control in-room media devices such as the STB(s) 112, projector(s) 114, and/or TV(s) 116 in the user's assigned guest room. As shown in FIG. 4, the user may also control other services in the hotel such as ordering room service (button 464) or toggling the 'do not disturb' indicator (button 470) to name two examples. Commands and other information such as status information may be sent by app 140 to the local app server 108*a* and vice versa at this step according to the users actions within app 140.

At step 720, the media device controller 104 operates the various in-room devices 112, 114, 116 in dependence upon the user's selections within the room control app 140. For example, the user may select to change TV channels within app 140 and the media device controller 104 thereafter sends a corresponding channel change command to the in-room TV 116 in the guest's room.

At step 722, the user closes the hotel's room control app 140 in order to perform other activities on the mobile phone such as surfing the Internet.

At step 724, the user opens a web browser application on the mobile phone 122*a* and attempts to access a URL of an external website 130.

At step 726, the HSIA controller 106 allows the user to access the Internet at a basic service entitlement limited to 128 kbps offered for free to guests of the hotel 102. Part of this step may involve the HSIA controller 106 giving the user the option to purchase a higher service entitlement for Internet access but in this example it is assumed that the user declines and selects the lowest possible service entitlement.

At step 728, the HSIA controller 106 begins to monitor various aspects of the mobile phone's 122a usage of the Internet access service at the hotel 102.

FIG. 8 illustrates various aspects that be monitored by the HSIA controller 106 as the mobile phone 122a uses the Internet service at the hotel at the basic service entitlement. In this embodiment, the HSIA controller 106 working together with the bandwidth manager 218 limit the mobile phone 122a's access to the Internet 120 by only allowing mobile phone 122a to perform basic web browsing at slow speeds. At the same time, the HSIA controller 106 monitors and detects whether any of a plurality of different events described below have occurred. When any of these events occurs, this represents a predetermined condition that indicates that the mobile device and/or its user may benefit by upgrading the service entitlement for Internet access. The collection of steps 704 in FIG. 8 may be performed by the one or more processors 202 of the control server 200 as indicated below. Alternatively, the steps may be performed by another device different than specified below such as when the HSIA controller is implemented in a standalone server.

At step 810, the HSIA controller 106 monitors the bandwidth usage of the mobile phone 122a, for example by monitoring traffic passed between hotel LAN 110 and the Internet 120 that has a source or destination IP/MAC address of the mobile phone 122a. In this embodiment, the HSIA controller 106 automatically keeps a record of the average bandwidth utilization separately for both upstream and downstream traffic for the mobile phone 122a. The average bandwidth values for each of upstream and downstream reflect the last five minutes of activity and are saved in a bandwidth database table (not shown) in the stored data 224. Other time values other than five minutes may be utilized in other configurations.

Periodically the HSIA controller 106 compares the most recent average bandwidth for the mobile phone 122a with the bandwidth allocation for the mobile phone 122a stored in column 316 of the table shown in FIG. 3. When the mobile phone's 122a average bandwidth in either the downstream and/or upstream directions are within a 90% threshold of the bandwidth allocation specified in column 316, the mobile phone 122a is deemed to have met the bandwidth threshold of step 810 and control proceeds via node "A" to step 910 of FIG. 9. Otherwise, if the mobile phone 122a has not reached within 90% of its bandwidth limit, control proceeds to step 812. For clarity, the node label "A" is used to simplify referring to this source node since there are so many different paths from steps 810, 812, 814, 816, 818, 820, 822, 824 that lead to step 910.

Although in this configuration both the upstream and downstream bandwidths are limited to the bandwidth allocation in column 316, in other configurations there may be a different bandwidth limit for each direction. Additionally, although 90% of the bandwidth cap for the mobile phone 122a is utilized as the bandwidth threshold in this embodiment, other bandwidth thresholds may also be utilized and these thresholds may be different and or dynamically change over time depending on the mobile device 122 being monitored, the Internet service entitlement of that mobile device, or other factors such as the user identifier in column 304 for the mobile device 122 (e.g., VIP users may have different thresholds than regular users). The bandwidth threshold may also involve a time component such as checking whether the user has been at 90% of the bandwidth cap for a certain amount of time such as one to ten minutes. This avoids triggering the upgrade invite in response to a mere momentary burst of data to/from mobile phone 122a.

At step 812, the HSIA controller 106 monitors whether the user who is associated with the mobile phone 122a attempts to start using another mobile device 122d on hotel LAN 110 to access the Internet 120. In one configuration this may be done by the HSIA controller 106 performing port tracing on the network traffic received from the new mobile device 122d to determine the guest room associated with the new mobile device 122d and then determining whether the guest currently assigned to that guest room as recorded in the PMS 118 has changed since an unexpired HSIA login associated with that room was created. These and other techniques of detecting when a user is attempting to add an additional mobile devices 122d after already logging in and possibly paying for Internet access on primary mobile device such as mobile phone 122a are explained in further detail in Canadian Patent No. 2,788,573 issued Jul. 9, 2013 and corresponding U.S. Patent Application Publication No. 20140068721 published Mar. 6, 2014, both entitled, "ALLOWING GUEST OF HOSPITALITY ESTABLISHMENT TO UTILIZE MULTIPLE GUEST DEVICES TO ACCESS NETWORK SERVICE" and both incorporated herein by reference. When a second or additional mobile device 122 associated with the same location (i.e., guest room number) and/or user (e.g., user loyalty number or other identifier) is detected, control proceeds via node "A" to step 910 of FIG. 9; otherwise control proceeds to step 814.

At step 814, the HSIA controller 106 detects whether the mobile phone 122a has attempted to register itself as a server on the hotel LAN 110. This may be done by the HSIA controller 106 monitoring LAN 110 to detect Bonjour™ or other zero-configuration server registration attempts by mobile phone 122a. In this configuration, the basic HSIA service entitlement at the hotel 102 does not include the mobile phone 122a acting as a server. However, if the user upgrades to a higher service entitlement such as premium then the mobile phone 122a is permitted to act as a server and the HSIA controller 106 will either open ports in the hotel's firewall/gateway 220 or assign to the mobile phone 122 a public IP to thereby allow devices outside the hotel (e.g., servers 130 on the Internet 120) to initiate and establish incoming connections with the mobile phone 122a on LAN 110. When the mobile phone 122a attempts to register a server, control proceeds via node "A" to step 910 of FIG. 9; otherwise control proceeds to step 816.

At step 816, the HSIA controller 106 detects whether the mobile phone 122a has attempted to utilize a restricted Internet protocol. The HSIA controller 106 may make simple judgments regarding protocols in use by the mobile phone 122a according to the destination ports utilized in TCP connection requests made by mobile phone 122a. These judgments are simple in the sense that, although not perfectly accurate, they do not result in significant load on the HSIA controller 106. For example, it is well known that port 80 is associated with HTTP, port 443 is associated with HTTPS, and ports 20 and 21 are associated with file transfer protocol (FTP). Other port numbers are well-known to be associated with other protocols. In one example, the basic service entitlement at which the mobile phone 122a is currently operating may only permit basic web browsing but not FTP transfers. The HSIA server 106 working in tandem with gateway 220 can therefore monitor the destination (and possibly source) ports of network traffic to/from mobile phone 122a in order to determine that mobile phone is attempting to utilize FTP.

If desired, the HSIA controller 106 may also perform packet inspection and analysis on the contents of packets to/from mobile phone 122*a* even for allowed port numbers to ensure that mobile phone 122*a* does not tunnel restricted protocols over an allowed port. Such inspection and analysis will burden the HSIA controller 106 with higher load but may be desirable in some applications.

When the mobile phone 122*a* attempts to utilize a restricted protocol, control proceeds via node "A" to step 910 of FIG. 9; otherwise control proceeds to step 818.

At step 818, the HSIA controller 106 detects whether the mobile device is attempting to stream media content via hotel LAN 110. In addition to using protocol and port detection techniques as previously described in step 816 to detect streaming and sharing specific protocols such as AirPlay℠, AllShare®, digital living network alliance (DLNA®), the HSIA controller 106 may also monitor destination URLs and IP addresses requested by the mobile phone 122*a* on the Internet.

In a first example, local media sharing may be detected when the mobile phone 122*a* makes a multicast domain name system (mDNS) request for an AirPlay® server on LAN 110. In this situation, the HSIA controller 106 deems the mobile phone 122*a* to be attempting to stream media. In another example, the URLs and IPs addresses associated with various popular or well-known media streaming websites such as YouTube®, Hulu®, Vimeo™, Metacafe™, Amazon® etc. may be stored in the stored data 224 and the HSIA controller 106 may deem the mobile phone 122*a* to be attempting to stream media whenever mobile phone 122*a* attempts to access one of these URLs or IP addresses. In this example, media streaming may be blocked for mobile phone 122*a* at the basic service entitlement; alternatively, media streaming may be technically possible but since the allowed bandwidth of the basic service entitlement is set so low the quality of the data transfer rate will be insufficient to meet user demands.

When the mobile phone 122*a* attempts to stream media content via LAN 110, control proceeds via node "A" to step 910 of FIG. 9; otherwise control proceeds to step 820.

At step 820, the HSIA controller 106 detects whether the mobile phone 122*a* is attempting to perform IP conferencing such as audio visual conferencing. Protocol detection, port detection, destination address detection, and/or bandwidth usage may all performed at this step to detect when the mobile phone is attempting an IP conference. As the basic service entitlement is insufficient to handle a high quality IP conferencing it would beneficial if the user upgraded to the premium package. When the HSIA controller 106 detects that the mobile phone 122*a* is attempting to perform IP conferencing via LAN 110, control proceeds via node "A" to step 910 of FIG. 9; otherwise control proceeds to step 822.

At step 822, the HSIA controller 106 detects whether the current time as tracked by the clock chip 204 is within X minutes (e.g., 40 minutes) from the HSIA login expiry 310 for mobile phone 122*a*. In this configuration, the basic service entitlement is only offered for free to current guests of the hotel 102 and expires on the day of their checkout two hours after checkout time. However, as many guests may have flights later in the day or evening, they may still wish to purchase Internet access for the remaining time they are in the vicinity (e.g., within range of AP 124) of the hotel 102 but are no longer a guest. Likewise, a guest who previously purchased the premium package may still be using the Internet when that package is nearing its expiry. Any mechanism of detecting when expiry is nearing such as a time chip, software or hardware countdown timers etc. may be utilized at this step 822. When the HSIA controller 106 detects that the mobile phone's current Internet service entitlement is within a threshold time duration from the expiry date/time in column 310, control proceeds via node "A" to step 910 of FIG. 9; otherwise control proceeds to step 824.

At step 824, the HSIA controller 106 detects whether the mobile device 122*a* has attempted to perform any other restricted actions or whether any other conditions are met that indicate that the mobile device 122*a* would benefit from upgrading their HSIA service entitlement. The specific restricted actions monitored at this step may be a hotel-specific configuration setting so that different hotels 102 can watch for different conditions. For example, at a hotel 102 with a conference occurring, a condition may be set to the expiry time of the conference. When one of these hotel-specific conditions is met, control proceeds via node "A" to step 910 of FIG. 9; otherwise control returns to step 810 to again check for any of the conditions of steps 810 to 824.

FIG. 9 firstly illustrates how the system 100 sends the push notification message to the mobile phone 122*a* via the push notification gateway 128 in response to detecting any of the predetermined conditions shown in steps of steps 810 to 824 of FIG. 8. The collection of steps 706 in the top portion of FIG. 9 may be performed by the one or more processors 202 of the control server 200 along with processors (not shown) of the push notification gateway 128 and the mobile phone 122*a* as indicated below. Alternatively, illustrated steps may be performed by other devices such as by one or more processors of the central app server 108*b* in other configurations.

At step 910, the local app server 108*a* sends a notification message to the device token previously received from the app 140 running on the mobile device at step 716. The notification message is sent via a push notification gateway 128 such as an Apple® APNS gateway server on the Internet 120.

At step 912, the push notification gateway 128 sends the notification message to the mobile phone 122*a* identified by the device token.

At step 914, the OS running on the mobile phone 122*a* receives the push notification message and displays an alert, plays a sound, updates a badge count, or otherwise alerts the user to the incoming push notification for the app 140. For instance, the OS may display a text message such as shown in the alert window 530 of FIG. 5.

At step 916, the user opens or otherwise activates the notification message which causes the OS running on the mobile phone 122*a* to open the hotel room control app 140 and trigger the upgrade invite for the user as shown in window 580 of FIG. 5.

At step 918, the app 140 determines whether the user has chosen to upgrade their HSIA service. If the user chooses to not upgrade, control ends at step 926; alternatively, when the user agrees to upgrade their HSIA service entitlement such as by pressing the "Yes, bill to my room" button 582 in FIG. 5, control proceeds to step 920.

The bottom portion of FIG. 9, namely collection of steps 708, illustrates how the system 100 upgrades the HSIA service entitlement for the mobile phone 122*a* and bills the user. The collection of steps 708 may be performed by the one or more processors 202 of the control server 200; alternatively, these steps may be performed by difference devices such as when the various HSIA control server 108, local and/or central app server 108*a,b*, bandwidth manager 218, gateway/firewall 220 are implemented in one or more separate devices such as standalone computer servers.

At step 920, the local app server 108a receives the upgrade command from the mobile device 122a such as in response to the user clicking the "Yes, bill to my room" button 582 in the hotel app 140 as illustrated in FIG. 5.

At step 922, the HSIA controller 106 updates the various HSIA service entitlement settings for the mobile phone 122a in columns 308 of FIG. 3 and reconfigures the bandwidth manager 218 and/or gateway/firewall 220 to enforce these new settings for the mobile phone 122a. As shown in FIG. 6, after these new settings for the upgraded service entitlement are activated, the mobile phone 122a receives increased bandwidth and the online movie the user was trying to stream now comes in high quality resolution. Any other additional features of the premium Internet package such as more personal devices 122, onsite AirPlay® media streaming to other devices on hotel LAN 110 such as in-room TVs 116, remote video streaming from external web servers 130, server capabilities, unrestricted protocols, delayed expiry time, etc. are activated as well. The specific features that are included in the upgraded service entitlement may be adjusted according to the site-specific requirements and typical guest needs of the hospitality establishment 102. The upgrade may be done without interrupting the user's ongoing Internet session in some embodiments, or the user's Internet session may alternatively be closed and restarted at the higher service entitlement.

At step 924, the local app server 108a posts the room charge to the PMS 118 so that the room's folio will include the charge for upgrading to the premium Internet package. Other types of billing such as credit card billing may also be utilized at this step or combined with step 918 rather than PMS-based billing.

At step 926, the process in this example ends. However, in an actual implementation deployed at a hospitality establishment 102 the process may return from step 924 to step 810 to continue monitoring for further conditions of the mobile phone's 122a Internet session for as long as the mobile phone 122a is connected to the hotel LAN 110. For example, even if the mobile phone 122a is now upgraded to the highest service entitlement available (e.g., premium Internet access in this example), this service entitlement is not for an unlimited time and will expire according to the date/time values in column 310 of FIG. 3 in the row associated with mobile phone 122a. Thus, at a minimum, the HSIA controller 106 may continue performing step 822 to check to see whether the current time is within a threshold duration of the expiry time. If yes, a push notification may be sent (collection of steps 706) to invite the user to upgrade their service entitlement to a later expiry time. Likewise, assuming the user lets the premium package expire without renewing, the HSIA controller 108 may again return to step 810 in order to beginning checking all the various conditions of FIG. 8 to see if the user might benefit from re-upgrading to premium access.

In another example, premium may not be the highest service entitlement, there may be an even higher service entitlement with greater bandwidth caps and/or reserved bandwidth rates and the above process can again be repeated to detect conditions and send a push notification whenever the user may benefit from upgrading to one of the higher service entitlements. The notification message inviting the user to upgrade may also recommend which of the various higher levels may be most suitable to the user based on their past activity and/or the specific condition(s) in FIG. 8 that triggered the alert.

In an exemplary embodiment, all the user's mobile devices 122 may be monitored in aggregate using the above process and then the app server 108 sends a push notification message to all of the user's mobile devices that have previously installed and run the hotel's room control app 140. For example, assume that all three of mobile phone 122a, tablet computer 122a, and laptop computer 122c all belong to a single guest or family who is staying in one hotel room and the guest/family are currently only entitled to access the Internet 120 at the basic service entitlement. By monitoring the various aspects of all of those mobile devices 122a,b,c to check for the conditions shown in FIG. 8, the HSIA controller 106 can detect if any one or more of the user's devices 122,a,b,c would benefit from upgrading to the premium package. The average bandwidth monitored at step 810 may be the total bandwidth together utilized by all of the user's devices 122a,b,c. The push notification message may then be sent to the various device tokens in column 306 of FIG. 3 for each of the devices 122 associated with the guest/family.

Perhaps a user only installed the hotel's room control app 140 on the user's mobile phone 122a because the user finds it convenient to change the TV 116 channels using their mobile phone 122a rather than the regular infrared TV remote control. Even though the user has not installed or run the hotel room control app 140 on any of the user's other devices 122b,c, in the event the user later attempts to access large amounts of bandwidth on at least one of the tablet computer 122b and the laptop computer 122c, the above process may trigger at step 810 due to the bandwidth usage on one of these two devices 122b, c. However, at step 910 the app server 108 sends a push notification to the user's mobile phone 122a since this is the only of the user's devices 122 that has installed app 140. In this way, the system 100 displays a notification inviting the user to perform the upgrade on a different mobile device 122 than the mobile device 122 that triggered the alert to be sent.

To find which mobile devices 122 are associated with the user, the local app server 108a in this embodiment queries the stored data table 122 in FIG. 3 to find all the rows (each corresponding to a different mobile device 122) that have the same user identifier in column 304. The local app server 108a may also find common devices 122 associated with a single user by matching other user data stored for each mobile device 122 in other columns (not shown) such as the user's email address or the user's name or partial name. The user information may be authenticated against and looked up from information of the guest currently assigned to the guest room as stored in the PMS 118. For example, when a user device logs in for Internet access at the HSIA controller 106's login page, the HSIA controller 106 may utilize two factor PMS information such as an email match (and/or partial name validation) to authenticate the device 122 for Internet access and then store this user information for the now logged in device 122 in the stored data 224. Thereafter, at step 910 the local app server 108a searches the stored data 224 to lookup any mobile devices 122 on record that have matching user information with the mobile device 122 that triggered the upgrade invite condition in FIG. 8. The local app server 108a then filters the user's mobile devices 122 to find which one(s) also have a valid push notification device token specified in column 306. A non-null device token in column 306 indicates that the mobile device 122 has previously installed the hotel's app 140 and may therefore be capable of receiving and displaying push notifications to the user. At step 910, the local app server 108a sends a push notification message to any or all of the mobile devices 122 on record that are both associated with user (have matching user information) and that have non-null device token specified in column 306 (meaning they are capable of receiving push notifications associated with hotel app 140).

A benefit of the app server 108 sending a push notification to other of the user's mobile devices 122 at step 910 is that this allows users with the app 140 installed on their mobile phone 122a to receive the push notification message inviting the user to upgrade their Internet experience even when the mobile phone 122a is not currently connected to the hotel's wireless network (AP 124). The user's mobile phone 122a instead receives the push notification message from the push notification gateway 128 via telecom phone network 134 and cell tower 136. The push notification message informs the user that their tablet computer 122b or laptop computer 122c is/are using all of their assigned bandwidth (or has/have a crossed a bandwidth threshold) at hotel 102 even when neither of the tablet 122b or laptop 122c have installed the hotel app 140.

Continuing the above example, in the event that all three of the user's mobile devices 122a,b,c have installed the hotel app 140, the app server 108 may at step 910 send three push notification messages—one to each of the device tokens for the three devices 122a,bc. The notification message or subsequent screens that are opened by the app 140 after the user clicks the "More info" link in the push notification message 530 may display device-specific information for each of the user's mobile devices 122 such as a ranking of the user's devices 122 in order of descending bandwidth utilization. The user may thereby see which of the devices 122a,b,c would benefit from the upgrade.

To assist users who do not bring a personal mobile device 122 to the hospitality establishment 102, the establishment 102 may provide a loaner mobile device 122 to the user and this loaner device 122 is monitored and pushed a notification message in the same manner as described above. It is therefore not a requirement that the mobile device 122 must belong to the user.

In an embodiment, the app server 108 may cause a similar notification message inviting the user to upgrade Internet access to be displayed on the user's in-room TV 116. An example usage scenario in this embodiment is as follows: a user checks in to a particular hotel room (e.g., "room 101") and the room assignment information is stored in the PMS 118. Thereafter, when the user is surfing the Internet on a user device 122 the above described monitoring of the various conditions associated with the user's device 122 in FIG. 8 take place as previously described. When one of the conditions is triggered (i.e., when control proceeds to node "A"), the local app server 108a sends a command to the media device controller 104 to trigger an alert to be displayed on the in-room TV 116 in the guest room associated with the user. As shown, the table in FIG. 3 stores in column 304 the user's loyalty program member number that can be used to search the PMS 118 to find the user's currently assigned room. Alternatively, the user may enter their room number as a part of the HSIA login process with the HSIA controller 106 and the room number may be stored in the stored data 224 of FIG. 3. To cause the alert message to be displayed on the TV 116, the media device controller 104 sends a command to the STB 112 attached to the TV to overlay the alert in a text box in the upper corner of the TV 116 screen similar to how window 530 is displayed in the upper corner of touchscreen 400 of the user's mobile phone 122a in FIG. 5. For example, the alert 530 shown by the TV may appear superimposed on top of the television program the user is currently watching. In another embodiment, the media device controller 104 sends a command to the in-room TV 116 causing the TV to turn on so that the alert 530 can be seen immediately, or to flash or otherwise indicate a message-waiting light indicating that there is a notification message 530 waiting to be viewed.

In some embodiments, at step 910 in FIG. 9 the app server 108 may send both a push notification to the device token of the user's one or more mobile devices 122 and also send a command to the media device controller 104 at the hotel 102 to display a similar notification alert on using the in-room TV 116 in the guest's room. The guest may choose to open the notification message on any of their mobile devices 122 or on the in-room TV 116. In the event that the user uses the in-room TV they may use either the infrared TV remote or the room control app 140 to click the upgrade alert on the TV 116. The TV 116 then displays a user interface (UI) similar to that shown by the hotel app 580 in FIG. 5. The user interacts with the UI on the TV 116 using their infrared remote control (or another input device) to accept the Internet upgrade and initiate the billing to the user's room. Again, other types of billing may be used such rather than room-based billing in other configurations. Displaying an upgrade alert on the in-room TV 116 with content similar to push notification window 530 is particularly beneficial to help assist users who have brought mobile device(s) 122d to the hotel but have chosen to either not install the hotel's room control app 140 or installed the app 140 but refused push notification capabilities (or shut all types to "Off" in the settings screen 410 in FIG. 4). However, these users may still see the alert on their in-room TV 116 and the hotel 102 can still benefit from increased revenue from Internet service upgrades from some of these users who choose to upgrade.

Another benefit of utilizing the UI of the in-room TV 116 in the guest's room to display the notification alerts 530 and enable the user to upgrade their bandwidth is that this alert mechanism may prevent reliance on an external push notification gateway 128. For instance, the HSIA controller 106 may detect a user's tablet computer 122b is trying to exceed its bandwidth allotment, the HSIA controllers 106 sends a message of this fact which is received by the media device controller 104, and the media device controller 104 sends a command to the STB 112 connected to the TV 116 in the user's assigned hotel room in order to display the alert message 530 and allow the user to upgrade their bandwidth. When the user agrees to upgrade, the STB 112 sends an upgrade message back to the device controller 104, and the HSIA controller 106 increases the Internet bandwidth for the user and the PMS bills the user's room folio in response. Although this process does also fully support concurrently sending push notification messages directly the user's mobile devices 122 and allowing the user to upgrade via the UI or browser running on the mobile devices 122, it does not require this and therefore ads both redundancy and reliability to make sure the user is made aware of the option to upgrade their Internet and can do so without reliance on their-party devices such as the user's device and external push notification gateway 128. Furthermore, since a third-party push notification gateway 128 may be down or otherwise delay delivery of the alert message 530, the in-room TV's 116 alert message 530 may be received sooner and more timely by the user. In other words, the TV's alert message 530 regarding bandwidth upgrade has a higher likelihood of being seen by the user right as the user is noticing the effects of the restricted bandwidth. For this reason, the in-room TV 116 based notification of alert 530 may tend to have a high conversion rate for successful upgrades by users thereby increasing the hospitality establishment's upgrade revenue.

Furthermore, other types of alerts may also be sent to the user at step 910 in addition to or instead of a push notification message via push gateway 128 and an in-room TV 116 displayed message via media device controller 104. For example, the app server 108 may email the user, send a short message service (SMS) or other text message to the user, call the user on the phone and play an automated message, and/or notify the user in any other suitable manner. Many of the user's contact methods such as email address(es) and phone numbers may be stored in the PMS 118 and correlated to the IP/MAC addresses of the user's mobile devices 122 via the user's identifier stored in column 304 of FIG. 3. The app server 108 may gather the user's points of contact in order to determine on which ones to notify the user of the upgrade process. The messages sent to the user may include a URL of the hotel's HSIA welcome web page and/or other instructions for how the user can upgrade their Internet service entitlement or obtain customer service such as via by dialing a predetermined extension on their in-room phone.

A bandwidth control screen may also be provided on either or both of the guest's in-room TV 116 and the guest's various mobile devices 122 via app 140. For example, the main menu 460 of the room control app 140 shown in FIG. 4 has the "Internet control panel" button 472 and the in-room TV 116 menuing system may include a similar button or option available to users when they turn on the TV. Assuming the user is at the basic service entitlement, upon clicking to view the control panel, the user may be presented with a screen similar to the upgrade screen 580 shown in FIG. 5. In this way, the user is also able to upgrade to a higher service entitlement even if none of the events in FIG. 8 are triggered, or in the event that they are triggered for the user's mobile device 122 but the user has not installed app 140 on their personal devices 122, blocked the push notification capabilities, and/or are not currently watching TV 116 in their guest room at the time they want to upgrade. Some guests may purchase upgrades using the Internet control panel on either in-room and the hospitality establishment 102 benefits from the increase revenue.

Figure 10:
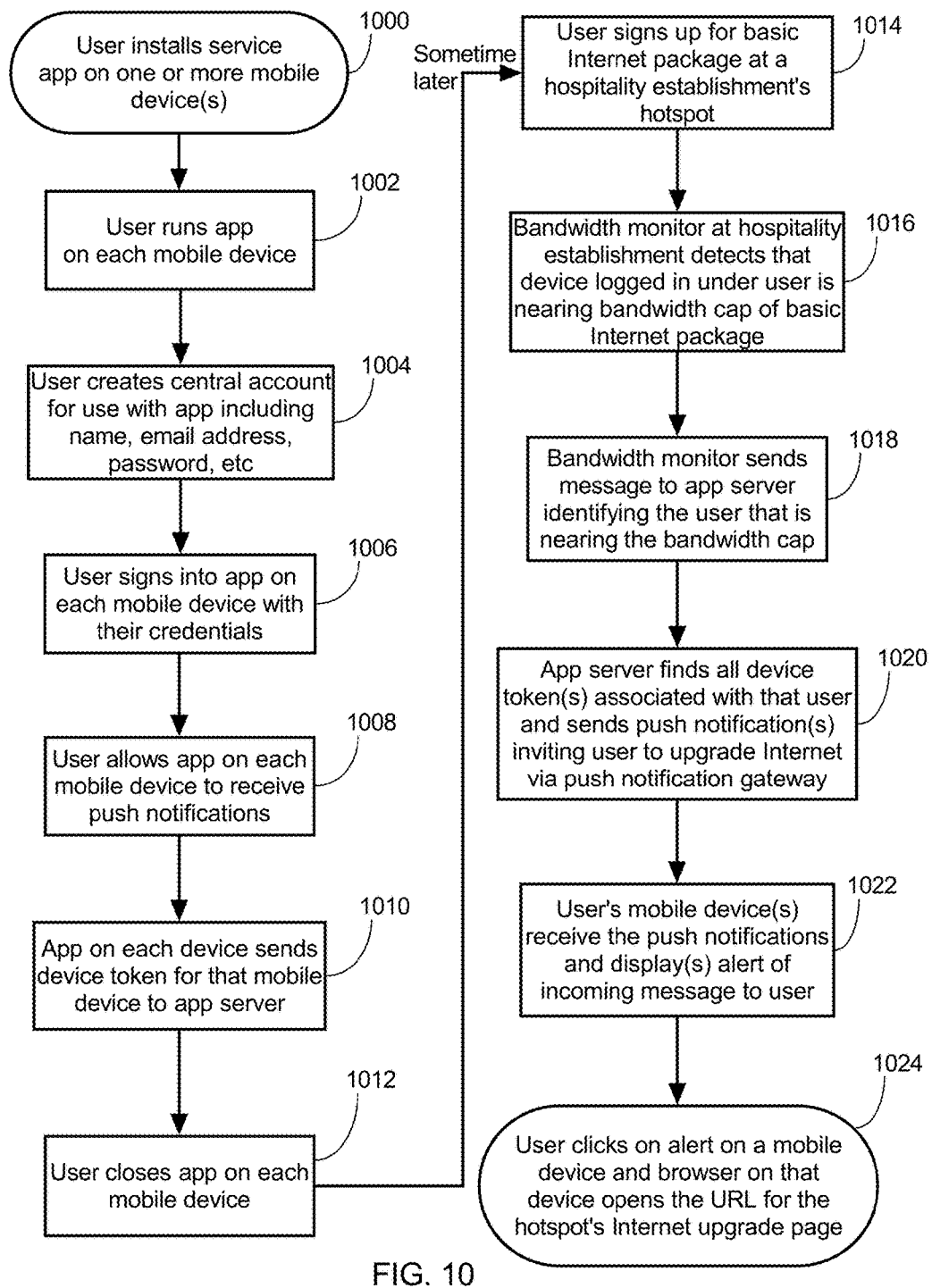
FIG. 10 illustrates a flowchart describing a method of inviting a user to upgrade Internet access at a hospitality establishment according to an exemplary embodiment of the invention.

FIG. 10 illustrates a flowchart describing a method of inviting a user to upgrade Internet access at a hospitality establishment according to another embodiment of the invention. The steps of the flowchart are not restricted to the exact order shown, and, in other configurations, shown steps may be omitted or other intermediate steps added. In this embodiment, the system operates as follows:

At step 1000, the user installs a hospitality service app 140 on one or more of the user's mobile device(s) 122. The hospitality app 140 could be the hotel room control app 140 of the previous examples or could be another type of service application such as a food ordering app for a retail food establishment. In this example, the user downloads and installs the app 140 on their mobile device(s) 122 before the user has arrived at the hospitality establishment 102. Installing the app prior to arrival is useful for the user to take advantage of other functionality and services supported by app 140 such as travel planning, remote check-in, ordering of food to their home or another location, sending and receiving messages with the hospitality establishment 102 such as requesting vacancy information or making a reservation, etc. depending on desired functionality of app 140. The user may install the app 140 by downloading it from an app store or other web server available on the Internet 120.

At step 1002, the user runs the app 140 on each of their mobile devices 122 on which the app 140 is now installed.

At step 1004, assuming the user does not yet have an account, the user registers (creates) an account on the central app server 108*b*. This step may be performed by the app 140 running on the user's mobile device 122 providing a 'create account' button when no user is currently signed in to the app 140. Alternatively, the app 140 may open a web browser application on the mobile device directed at an account creation URL provided by the central app server 108*b*. In some embodiments, registering an account on central app server 108*b* may be a required step in order for the user to utilize all or certain functionality of app 140; alternatively, registering a user account may be optional but in this example it is assumed that the user chooses to register an account. Part of the account registration process involves the user providing identifying information such as the user's email address and name. The user may also establish login credentials such as a username and password. Other types of login credentials may also be established such as sign-in key files etc. Step 1004 to register an account is only done once by the user on a single mobile device 122; thereafter, on subsequent runs of app 140 by the same user on any of the user's mobile device(s), step 1004 is omitted from the flowchart of FIG. 10 since the user already has an account.

At step 1006, the user signs in to the app 140 using the credentials for their personal account on the central app server 108*b* which were previously created at step 1004. Assuming the user installs and runs app 140 on multiple mobile devices 122, the user logs in to the app 140 using their central user account credentials on each mobile device 122.

At step 1008, the user allows the app 140 running on each the user's mobile device(s) 122 to receive push notifications. In one example, the app 140 may query the user when the app 140 is first run as to whether push notification message are allowed, in another example, the user may enter a push notification configuration screen 410 such as that shown in FIG. 4 to enable push notifications and choose the desired alert types 412, 414, 416, 418.

At step 1010, the app 140 sends the device token for the mobile device 122 on which the app 140 is running to the central app server 108*b* via the Internet 120. Taking an example where the user has installed the app 140 on three devices, namely, mobile phone 122*a*, tablet computer 122*b*, and laptop computer 122*c*, the apps 140 running on each of these three mobile devices 122*a,b,c* send the corresponding device token for these devices to the central app server 108*b*. The central app server 108*b* stores the various device token(s) received from the user's mobile devices 122*a,b,c* with the user's central account information. Thus, the user's account on the central app server 108*b* may include information related to the user such as: the user's name, email address, username, password, in addition to the various device tokens received from mobile devices 122*a,b,c* on which the user has logged in to app 140 with the user's login credentials.

At step 1012, the user closes the app 140 on each of their mobile device(s) such as to perform other tasks.

At step 1014, after some indeterminate period of time, the user travels to a hospitality establishment 102 providing Internet access. For example, while on a business trip the user may visit a hotel or coffee shop providing wireless hotspot or wired Internet functionality. The user connects to a wireless access point (AP) 124 or Ethernet port 126 at the establishment and completes the hospitality establishment's Internet sign-in process such as accepting the terms and conditions, providing user information, and possibly completing a payment process. In some embodiments, the sign-in process is based on personal information of the user received at a login web page provided by an HSIA controller 106 at the hospitality establishment 102. In other embodiments, the login process may be fully automatic and transparent such as described in U.S. Patent Application Publication No. 20130305320 published Nov. 14, 2013 and entitled, "AUTOMATIC SERVICE ACTIVATION FOR USER DEVICE UPON DETECTING ITS DEVICE IDENTIFIER ON NETWORK OF HOSPITALITY ESTABLISHMENT", which is incorporated herein by reference. Again, for the purposes of this example, it is assumed that the Internet access service entitlement to which the user obtains is the lowest of a plurality of different service levels. In other words, there is at least one upgraded service level that includes other features such as higher bandwidth to which the user could upgrade if later desired.

At step 1016, the bandwidth manager 218 at the hospitality establishment monitors bandwidth usage of the Internet 120 by the user and detects that the user is nearing their bandwidth cap. Other types of predetermined conditions indicating the user may benefit from an Internet upgrade such as previously shown and described in FIG. 8 may also be detected at this step in a similar manner.

At step 1018, in response to detecting the condition that the user is nearing their bandwidth cap in step 1016 (or another condition indicating an upgrade would be beneficial for the user), the bandwidth manager 218 sends a message to the central app server 108b identifying the user.

At step 1020, the central app server 108b finds the various device token(s) associated with the identified user, and the central app server 108b then sends a separate push notification message to each of the found device tokens via the push notification gateway 128. Each of the push notification messages invite the user to upgrade from the basic Internet package to an upgraded Internet package at the hospitality establishment 102.

In steps 1018 and 1020, the user may be identified in any suitable manner. For example, the user may have previously logged in to the hospitality establishment's Internet service at step 1014 using the same login credentials that the user previously established for use with the app 140 at step 1004. Having consistent login credentials on both the app 140 and for logging in to the Internet works well when the app 140 is specific to the hospitality establishment 102 such as a room control app 140 for a hotel 102, or a drink ordering app 140 for a coffee shop 102. In this example, the central app server 108b simply looks up in its user profile database the user profile number that is associated with the login credentials received from the bandwidth manager 218 in order to find the device token(s) associated with the user's various mobile devices 122a,b,c.

Other ways of identifying the user may also be utilized such as the email address, name, or other personal information of the user who logged in to the Internet at step 1014. For example, the bandwidth manager 218 may send the email address and/or name of the user who is nearing their bandwidth cap to the central app server 108b at step 1018 and the app server 108b searches for the device tokens associated with this user information. A loyalty number identifier of the user at the hospitality establishment 102 may be utilized to identify the user in a similar manner, where the user had previously entered their loyalty member number when creating the account on central app server 108b at step 1004. In yet another example of particular benefit when the hospitality establishment is a hotel 102, the may enter their room number when logging in to the Internet at the hotel 102, and the bandwidth manager 218 may retrieve any information associated with the currently registered guest of that room from the PMS 118 when the user is found to be nears their bandwidth cap (step 810). Any of the information about the currently registered guest is sent by the bandwidth manger 218 to the central app server 108b at step 1018 and the central app server 108b finds the device token(s) associated with this user information at step 1020.

At step 1022, each of the user's mobile devices 122a,b,c receives the push notification message to its device token from the push notification gateway 128 and displays or otherwise presents a push notification alert 530 to the user. As previously described for the collection of step 706 in FIG. 9, this step also involves the push notification gateway 128 sending the notification messages down to the user's mobile devices as identified by the device tokens via either the Internet 120 or the telecom phone network 134 (e.g., 3G, 4G mobile telecommunication network etc.).

At step 1024, assuming a visual push notification alert 530, the user clicks on the alert 530 icon on a particular mobile device 122, and the app 140 on that mobile device 122 automatically opens the web browser on the mobile device at the URL for the hospitality establishment's Internet package upgrade webpage. The user can thereby upgrade their Internet access to a higher service entitlement with a higher bandwidth allocation—see collection of steps 708 in FIG. 9. In the event the user does not wish to upgrade, the user may ignore or close the various alerts 530 on their mobile devices 122 and continue accessing the Internet 120 at the basic service entitlement. In an embodiment, the push notification messages sent to the user's mobile devices at step 1020 include a time-to-live or other timeout condition so that they are automatically deleted after one to two hours in the event that the user chooses to ignore them. The value of the time duration before they will be automatically deleted may be either a user configurable setting (e.g., on config screen 410 in FIG. 4) or an administrator setting such as chosen by a manager of the hospitality establishment 102 and/or the app developer.

In an advantageous embodiment of FIG. 10 it is not required that the user signs up and accesses the Internet 120 on the same mobile devices 122a,b,c that the user has installed the app 140 at step 100. Instead, the user may sign up and access Internet 120 at step 1014 on another mobile device 122d either owned by the user or provided by the hospitality establishment 102. For example, the user may be accessing the Internet at step 1014 on a corporate laptop on which the app 140 is not installed. However, if the user nears the bandwidth cap assigned by the bandwidth manager 218 to the corporate laptop, the user's mobile phone 122a will receive the push notification inviting the user to upgrade the Internet access on the corporate laptop.

In an advantageous embodiment of FIG. 10 it is not required that the app 140 has ever been run on any of the user's mobile devices 122a,b,c while the user is at the hospitality establishment 102. Instead, the user may install and run the app 140 on their mobile phone 122a while the user it at home or at the airport. Sometime later the user may arrive at the hospitality establishment 102 and the flowchart proceeds from step 1014-1024 without the user ever having run the app 140 while at the hospitality establishment 102. In fact, the user may even forget that they had previously installed and configured the app 140 to receive push notifications. The mobile phone 122a also does not need to ever be connected to the hospitality establishment 102's LAN as the push notification messages may be sent to the mobile phone 122a via the telecom network 134.

In an exemplary embodiment of the invention, a software application 140 running on a mobile device 122 allows a user to access a first service offered by a hospitality establishment 102. An app server 108 receives a device token from the software application 140, where the device token identifies the mobile device 122 for pushing notification messages of the software application 140 to the mobile device 122 via a push notification system. The mobile device 122 is monitored while accessing the Internet 120 in order to detect when the user may benefit from upgraded access to the Internet 120. The app server 108 then sends a notification message to the device token via the push notification system. The notification message invites the user to upgrade to an upgraded service entitlement for accessing the Internet 120, and the push notification system alerts the user to the notification message via the user interface of the mobile device 122 even when the software application 140 is not running on the mobile device 122.

In an exemplary embodiment of the invention, an app server 108 receives a device token from a software application 140 on a mobile device 122. The device token identifies the mobile device 122 for pushing notification messages of the software application 140 to the mobile device 122 via a push notification system. The mobile device 122 is monitored while accessing the Internet 120 in order to detect when the user may benefit from upgraded access to the Internet 120. The app server 108 then sends one or more notification message(s) to the user such as by sending a message to the device token of the mobile device 122 via the push notification system and/or to a display device 116 associated with the user at the hospitality establishment 102.

In an advantageous embodiment of the invention, the system 100 automatically notifies users of how to upgrade their Internet service entitlements after they have already logged in and are already accessing the Internet, thereby increasing hotel revenue and user satisfaction. In an advantageous embodiment of the invention, the system 100 notifies users of how to upgrade while they are using the Internet regardless of what application (web browser or other) and what protocol (including encrypted and non-web-based) the user happens to be using at the time. In an advantageous embodiment, the system 100 notifies a user of the Internet access upgrade process without disrupting or hijacking the user's existing network sessions to make the notification. In an advantageous embodiment of the invention, the system 100 notifies a user of the upgrade possibility at a time that the user likely needs or will benefit from the upgrade. In an advantageous embodiment, the system 100 does not require any unrealistic action by the user such as having to remember or save a URL in order to later upgrade their Internet service entitlement. In an advantageous embodiment, the system 100 sends a push notification to a mobile device 122 associated with the user and the push notification system sends the message to the mobile device via another network such as telecom network 134; in this way, the user beneficially receives the upgrade invite on a device 122 that may not currently be on the hotel's LAN 110. In an advantageous embodiment, the system 100 leverages the push notification capabilities of a mobile app 140 that many users will install and run in order to benefit from another service offered by the hospitality establishment independent from the service for which the system 100 is sending the invite to upgrade. In an advantageous embodiment, the system 100 complements and may be used together with other existing methods to encourage users to upgrade their Internet access; however, system 100 offers a superior experience for users who have the mobile app 140 installed and push notifications allowed on at least one mobile device 122, therefore more users are encouraged to upgrade when system 100 is employed than with existing methods only.

Although the invention has been described in connection with preferred embodiments, it should be understood that various modifications, additions and alterations may be made to the invention by one skilled in the art without departing from the spirit and scope of the invention as defined in the appended claims. For example, not shown in the flowcharts of FIG. 7-9 are cutting off the user's Internet when the expiry time is reached or the user leaves etc. however these steps may be added. In other examples, the app server 108 and/or the control server 200 may be centrally located somewhere external to the hospitality establishment 102 on the Internet 120 rather than at the hospitality establishment 102. The various devices described above or shown in the figures may be implemented as one or more computers having processor(s), network interface(s), storage medium/media, and other necessary hardware components.

In another example modification, at step 910, if the hotel's room control app 140 is open and running and already ready to receive direct communication from the app server 108, the app server 108 may simply send the notification message directly to the app 140 running on the mobile device 122 without going through push notification gateway 128.

Although the above examples have focused on a hotel room control app 140, in other embodiments of the invention system 100 app 140 may allow users to access other types of services at other types of hospitality establishments 102. For example, at a coffee shop, restaurant, or other retail food service location, the app 140 may be installed by users in order to allow the users to order drinks and other food products without lining up at a counter to make the order. Users may choose to allow the app 140 to accept push notifications in order to let the user know their order is ready for pickup or to receive other announcements from the hospitality establishment 102. The system 100 thereby beneficially leverages the push notification capabilities of a food service application 140 to also invite the user to upgrade their Internet access service entitlement at the food service location 102.

Although, the above description of FIG. 5 involves the app 140 showing an upgrade screen 580 after the user receives the push notification message, in other embodiments the app 140 may instead cause the web browser on the user's mobile device 122 to open the already-existing upgrade web page allowing users to upgrade. In other words, the app 140 may simply point the user in the direction of the upgrade process that is already implemented and available by the HSIA controller 106 at the hospitality establishment 102. This embodiment is beneficial to avoid having to duplicate functionality already available by HSIA controller 106 in the app 140. As previously mentioned the app 140 may be primarily utilized to access a service at the hospitality establishment 102 totally unrelated to Internet access and it may be undesirable to duplicate Internet upgrade functionality within the app 140 is some applications. Since the upgrade functionality already exists in HSIA controller 108 and a problem is that users just don't know the URL of the upgrade web page at the time they may want to upgrade, modifying app 140 to simply provide and optionally open this URL for the user in their web browser in response to a push notification 916 may greatly increase upgrade revenue for the establishment 102 with minimal changes to an already-deployed app 140.

In another example, rather than app 140 being primarily utilized to allow users to access other services at the hospitality establishment 102, app 140 may instead be dedicated to the Internet service at the hospitality establishment 102. For example, the app 140 may have a single function of providing an Internet access control panel that only handles Internet services at a hotel 102 or other establishment. The Internet dedicated app 140 may be optional such as in the above described embodiments where users do not need to install or run the app 140 in order to access the Internet 120; alternatively, the app 140 may be mandatory such that users cannot complete the login process within a web browser and instead need to install and run the app 140 in order to be authorized for access to the Internet 120.

In the above description, the exemplary user indication of "guest" is utilized to refer to users as it common for customers of a hospitality establishment to be referred to as guests. However, it is not a requirement that users must be customers of the hospitality establishment and the term "guest" in this description includes other users such as current guests in a hotel, people who are attending a conference or meeting in a hotel, staff members at the establishment, or any other person or user who may need or want to access a services at a hospitality establishment. Future guests that have reservations, potential future guests that don't yet have reservations, and other users may also be enabled to receive notifications of upgrade possibilities in a similar manner. For example, a demonstration of the technology may be available in a hotel lobby and all users would be able to try out the system 100.

It should also be noted that although portable devices that are easily carried are anticipated by the inventors as being particularly useful, it is not a strict requirement that the mobile devices 122 be easily carried. Other larger devices such as desktop computers that are also capable of being moved may act as mobile devices 122 in conjunction with the invention.

Although the invention has been described as being utilized at a hotel for illustration purposes, the present invention is equally applicable to any hospitality related location or service wishing to provide notifications inviting users to upgrade Internet service entitlements such as at hotspot locations including but not limited to hotels, motels, resorts, hospitals, apartment/townhouse complexes, restaurants, retirement centers, cruise ships, busses, airlines, airports, shopping centers, passenger trains, libraries, coffee shops, hotspots, etc. Additionally, the invention is applicable outside of the hospitality industry in addition to the above-described hospitality examples.

Furthermore, although the above examples have primarily focused on the service that is being upgraded being Internet access, in other embodiments, system 100 may notify and invite users to upgrade any other type of service. Any device at the hospitality establishment 102 may notify app server 108 of an upgrade possibility in order to cause a push notification to be sent down to the user's mobile devices 122 along with other types of messages such as SMS and/or email to the user's accounts and optionally displayed on the user's in-room display devices 116.

The various separate configurations, elements, features, embodiment, and modules of the invention described above may be integrated or combined. One or more processors may operate pursuant to instructions stored on a tangible, non-transitory computer-readable medium to perform the above-described functions. Examples of the computer-readable medium include optical media (e.g., CD-ROM, DVD discs), magnetic media (e.g., hard drives, diskettes), and other electronically readable media such as flash storage devices and memory devices (e.g., RAM, ROM). The computer-readable medium may be local to the computer executing the instructions, or may be remote to this computer such as when coupled to the computer via a computer network such as the Internet 120. The one or more processors may be included in a general-purpose or specific-purpose computer that becomes a special purpose machine performing the above-described functions as a result of executing the instructions. In another example, rather than being software modules executed by one or more processors, the described functionality may be implemented as hardware modules configured to perform the above-described functions. Functions of single modules and devices as described may be separated into multiple units, or the functions of multiple modules and devices may be combined into a single unit. Unless otherwise specified, features described may be implemented in hardware or software according to different design requirements. In addition to a dedicated physical computing device, the word "server" may also mean a service daemon on a single computer, virtual computer, or shared physical computer or computers, for example. Additionally, all combinations and permutations of the above described features and configurations may be utilized in conjunction with the invention.

What is claimed is:

1. A method of leveraging push notification capabilities available via a software application installed on a mobile device to dynamically upgrade an Internet access service entitlement for the mobile device, the method comprising:

communicating, by at least one application server, over a network, with the software application installed and running on the mobile device, the software application allowing a user of the mobile device to access a first service offered by a hospitality establishment through a user interface of the mobile device;

in response to communicating with the software application, receiving, by the at least one application server, a device token from the software application, the device token identifying the mobile device for use by the at least one application server to push notification messages associated with the software application to the mobile device via a push notification system;

allowing, by the at least one application server, the mobile device to access the Internet from the hospitality establishment with a first access entitlement, wherein the mobile device accesses the Internet over the network without running the software application;

monitoring, by the at least one application server, the mobile device's usage of the Internet in order to detect a predetermined condition;

in response to detecting the predetermined condition, sending, by the at least one application server, a notification message to upgrade the mobile device from the first access entitlement to a second access entitlement, the notification message being addressed to the device token and transmitted by the at least one application server to the mobile device via the push notification system, wherein the notification message is displayed by the user interface of the mobile device when the software application is not running on the mobile device;

receiving, by the at least one application server, an upgrade command from the software application running on the mobile device in response to the user interacting with the notification message displayed on the user interface of the mobile device; and in response to receiving the upgrade command, reconfiguring, by the at least one application server, one or more devices on the network that are separate from the mobile device to upgrade the Internet access service entitlement for the mobile device from the first access entitlement to the second access entitlement.

2. The method of claim 1, wherein:
the hospitality establishment comprises a lodging establishment having a plurality of guest rooms; and
the first service comprises guest control via the software application of in-room devices in a guest room assigned to the user.

3. The method of claim 1, wherein:
the monitoring, by the at least one application server, the mobile device's usage of the Internet in order to detect the predetermined condition comprises monitoring, by the at least one application server, a bandwidth utilization of the mobile device accessing the Internet to determine whether the bandwidth utilization has reached a predetermined threshold; and
the notification message invites the user to upgrade to a higher bandwidth.

4. The method of claim 3, further comprising:
indicating, by the at least one application server, in the notification message which of the user's mobile devices has a highest recent bandwidth utilization;
wherein the user has a plurality of mobile devices simultaneously accessing the Internet under the first access entitlement.

5. The method of claim 4, further comprising:
monitoring, by the at least one application server, a total bandwidth utilization representing all of the user's mobile devices in aggregate;
wherein the predetermined condition comprises the total bandwidth utilization reaching a predetermined aggregate threshold.

6. The method of claim 4, wherein the predetermined condition comprises an individual bandwidth utilization of at least one of the user's mobile devices reaching a predetermined individual threshold.

7. The method of claim 1, further comprising sending, by the at least one application server, a billing message to a billing server in order to bill the user for upgrading the Internet access service entitlement for the mobile device in response to receiving the upgrade command.

8. The method of claim 1, further comprising sending, by the at least one application server, the notification message to the device token via an external third-party push notification system in response to detecting the predetermined condition.

9. A non-transitory computer-readable medium comprising a plurality of computer executable instructions that when executed by one or more computers cause the one or more computers to at least perform steps of:
communicating over a network with a software application installed and running on a mobile device, the software application allowing a user of the mobile device to access a first service offered by a hospitality establishment through a user interface of the mobile device;
in response to communicating with the software application, receiving a device token from the software application, the device token identifying the mobile device for use by the one or more computers to push notification messages associated with the software application to the mobile device via a push notification system;
allowing the mobile device to access Internet from the hospitality establishment with a first access entitlement, wherein the mobile device accesses the Internet over the network without running the software application;
monitoring the mobile device's usage of the Internet over the network in order to detect a predetermined condition;
in response to detecting the predetermined condition, sending a notification message to upgrade the mobile device from the first access entitlement to a second access entitlement, the notification message being addressed to the device token and transmitted by the one or more computers to the mobile device via the push notification system, wherein the notification message is displayed by the user interface of the mobile device when the software application is not running on the mobile device;
receiving an upgrade command from the software application running on the mobile device in response to the user interacting with the notification message displayed on the user interface of the mobile device; and
in response to receiving the upgrade command, reconfiguring one or more devices on the network that are separate from the mobile device to upgrade an Internet access service entitlement for the mobile device from the first access entitlement to the second access entitlement.

10. An apparatus for leveraging push notification capabilities available via a software application installed on a mobile device to dynamically upgrade an Internet access service entitlement for the mobile device:
the apparatus comprising one or more processors coupled to a storage device wherein, by the one or more processors executing software instructions loaded from the storage device, the one or more processors are configured to:
communicate over a network with the software application installed and running on the mobile device, the software application allowing a user of the mobile device to access a first service offered by a hospitality establishment through a user interface of the mobile device;
in response to communicating with the software application, receive a device token from the software application, the device token identifying the mobile device for use by the one or more processors to push notification messages associated with the software application to the mobile device via a push notification system;
allow the mobile device to access the Internet from the hospitality establishment with a first access entitlement, wherein the mobile device accesses the Internet over the network without running the software application;
monitor the mobile device's usage of the Internet over the network in order to detect a predetermined condition;
in response to detecting the predetermined condition, send a notification message to upgrade the mobile device from the first access entitlement to a second access entitlement, the notification message being addressed to the device token and transmitted by the one or more processors to the mobile device via the push notification system, wherein the notification message is displayed by the user interface of the mobile device when the software application is not running on the mobile device;
receive an upgrade command from the software application running on the mobile device in response to the user interacting with the notification message displayed on the user interface of the mobile device; and
in response to receiving the upgrade command, reconfigure one or more devices on the network that are separate from the mobile device to upgrade the Internet access service entitlement for the mobile device from the first access entitlement to the second access entitlement.

11. The apparatus of claim 10, wherein:
the hospitality establishment comprises a lodging establishment having a plurality of guest rooms; and
the first service comprises guest control via the software application of in-room devices in a guest room assigned to the user.

12. The apparatus of claim 10, wherein:
the monitoring the mobile device's usage of the Internet in order to detect the predetermined condition comprises monitoring a bandwidth utilization of the mobile device accessing the Internet to determine whether the bandwidth utilization has reached a predetermined threshold; and
the notification message invites the user to upgrade to a higher bandwidth.

13. The apparatus of claim 12, wherein the one or more processors are further configured to:
indicate in the notification message which of the user's mobile devices has a highest recent bandwidth utilization;
wherein the user has a plurality of mobile devices simultaneously accessing the Internet under the first access entitlement.

14. The apparatus of claim 13, wherein the one or more processors are further configured to:
monitor a total bandwidth utilization representing all of the user's mobile devices in aggregate;
wherein the predetermined condition comprises the total bandwidth utilization reaching a predetermined aggregate threshold.

15. The apparatus of claim 13, wherein the predetermined condition comprises an individual bandwidth utilization of at least one of the user's mobile devices reaching a predetermined individual threshold.

16. The apparatus of claim 10, wherein the one or more processors are further configured to send a billing message to a billing server in order to bill the user for upgrading the Internet access service entitlement for the mobile device in response to receiving the upgrade command.

17. The apparatus of claim 10, wherein the one or more processors are further configured to send the notification message to the device token via an external third-party push notification system in response to detecting the predetermined condition.

18. The non-transitory computer-readable medium of claim 9, wherein:
the hospitality establishment comprises a lodging establishment having a plurality of guest rooms; and
the first service comprises guest control via the software application of in-room devices in a guest room assigned to the user.

19. The non-transitory computer-readable medium of claim 9, wherein the computer executable instructions, when executed by the one or more computers, further cause the one or more computers to perform steps of:
monitoring the mobile device's usage of the Internet in order to detect the predetermined condition comprises monitoring a bandwidth utilization of the mobile device accessing the Internet to determine whether the bandwidth utilization has reached a predetermined threshold;
wherein the notification message invites the user to upgrade to a higher bandwidth.

20. The non-transitory computer-readable medium of claim 19, wherein the computer executable instructions, when executed by the one or more computers, further cause the one or more computers to perform steps of:
monitoring a total bandwidth utilization representing all of the user's mobile devices in aggregate;
wherein the predetermined condition comprises the total bandwidth utilization reaching a predetermined aggregate threshold; and
the user has a plurality of mobile devices simultaneously accessing the Internet under the first access entitlement.

* * * * *